United States Patent
Edge et al.

(10) Patent No.: US 9,681,262 B2
(45) Date of Patent: Jun. 13, 2017

(54) METHOD AND APPARATUS FOR SUPPORTING LOCATION SERVICES VIA A HOME NODE B (HNB)

(71) Applicant: QUALCOMM Incorporated, San Diego, CA (US)

(72) Inventors: Stephen William Edge, Escondido, CA (US); Damanjit Singh, San Diego, CA (US); Jen Mei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 14/800,460

(22) Filed: Jul. 15, 2015

(65) Prior Publication Data

US 2015/0319567 A1 Nov. 5, 2015

Related U.S. Application Data

(62) Division of application No. 13/085,395, filed on Apr. 12, 2011, now Pat. No. 9,119,028.

(Continued)

(51) Int. Cl.
*H04W 4/02* (2009.01)
*H04W 76/04* (2009.01)
(Continued)

(52) U.S. Cl.
CPC .............. *H04W 4/02* (2013.01); *H04W 24/10* (2013.01); *H04W 36/04* (2013.01); *H04W 36/32* (2013.01);
(Continued)

(58) Field of Classification Search
CPC ....... H04W 4/02; H04W 24/10; H04W 36/04; H04W 36/32; H04W 76/046; H04W 84/045

See application file for complete search history.

(56) References Cited

U.S. PATENT DOCUMENTS 7,831,216 B1    11/2010 Yenney et al.
8,089,400 B1 *   1/2012 Fang ...................... G01S 19/05
                                              342/357.42

(Continued)

FOREIGN PATENT DOCUMENTS

EP         1617696 A1     1/2006
JP       2001309421      11/2001

(Continued)

OTHER PUBLICATIONS

3GPP: "3rd Generation Partnership Project; Technical Specification Group Radio Access Network; Home (e)NodeB; Network aspects(Release 8)" 3GPP Draft; R3-083410_R3.020_V0.9.1_Clean_V2, 3rd Generation Partnership Project (3GPP), Mobile Competence Centre; 650, Route Des Lucioles; F-06921 Sophia-Antipolis Cedex; France, No. Prague, Czech Republic; 20081117, Nov. 17, 2008 (Nov. 17, 2008), XP050324621, p. 55; figures 6.2.1.2.3-1, p. 51-p. 63.

(Continued)

*Primary Examiner* — Mehmood B Khan
(74) *Attorney, Agent, or Firm* — Arnold J. Gum

(57) ABSTRACT

Techniques for supporting location services for a home Node B (HNB) and its user equipments (UEs) are disclosed. In an aspect, location services may be supported for a UE by having an HNB inter-work between user plane and control plane location solutions. In one design, the HNB receives a request for a location service for the UE and communicates (i) with a location server via the user plane location solution and (ii) with the UE via the control plane location solution to support the location service for the UE. The HNB inter-works between the user plane and control plane location solutions. In another aspect, a location server may be used to support assisted GNSS (A-GNSS) for HNBs and UEs. In one design, an HNB exchanges PCAP messages with the location server via an HNB GW and exchanges (Continued)

RRC messages with a UE to support a location service for the UE.

12 Claims, 13 Drawing Sheets

Related U.S. Application Data

(60) Provisional application No. 61/324,156, filed on Apr. 14, 2010.

(51) Int. Cl.
  *H04W 24/10* (2009.01)
  *H04W 36/32* (2009.01)
  *H04W 36/04* (2009.01)
  *H04W 84/04* (2009.01)

(52) U.S. Cl.
  CPC ........ *H04W 76/046* (2013.01); *H04W 84/045* (2013.01)

(56) References Cited

U.S. PATENT DOCUMENTS

| | | | |
|---|---|---|---|
| 8,155,116 B2 | 4/2012 | Eriksson et al. | |
| 8,600,403 B2 | 12/2013 | Edge | |
| 8,620,255 B2* | 12/2013 | Edge | H04Q 3/0045 455/404.1 |
| 8,644,855 B2 | 2/2014 | Kolhe | |
| 8,971,840 B2 | 3/2015 | Edge et al. | |
| 2002/0150092 A1 | 10/2002 | Bontempi et al. | |
| 2004/0043773 A1 | 3/2004 | Lee et al. | |
| 2004/0147232 A1 | 7/2004 | Zodnik | |
| 2004/0180655 A1 | 9/2004 | Jang et al. | |
| 2005/0144647 A1 | 6/2005 | Zussman et al. | |
| 2006/0014517 A1 | 1/2006 | Barclay et al. | |
| 2006/0286961 A1 | 12/2006 | Levitan et al. | |
| 2006/0293066 A1 | 12/2006 | Edge et al. | |
| 2007/0135089 A1 | 6/2007 | Edge et al. | |
| 2007/0149213 A1 | 6/2007 | Lamba et al. | |
| 2007/0182547 A1 | 8/2007 | Wachter et al. | |
| 2007/0238448 A1* | 10/2007 | Gallagher | H04W 4/22 455/414.2 |
| 2007/0293215 A1 | 12/2007 | Dawson et al. | |
| 2007/0293239 A1 | 12/2007 | Dawson et al. | |
| 2008/0008157 A1 | 1/2008 | Edge et al. | |
| 2008/0076425 A1* | 3/2008 | Khetawat | H04W 88/12 455/436 |
| 2008/0085699 A1 | 4/2008 | Hirano et al. | |
| 2008/0090587 A1 | 4/2008 | Krause et al. | |
| 2008/0188243 A1 | 8/2008 | Giustina et al. | |
| 2008/0207170 A1* | 8/2008 | Khetawat | H04W 60/005 455/411 |
| 2008/0254809 A1 | 10/2008 | Kraufvelin et al. | |
| 2008/0267114 A1 | 10/2008 | Mukherjee et al. | |
| 2008/0273670 A1 | 11/2008 | Dickinson | |
| 2008/0305792 A1 | 12/2008 | Khetawat et al. | |
| 2009/0104905 A1* | 4/2009 | DiGirolamo | H04J 11/0093 455/434 |
| 2009/0135784 A1 | 5/2009 | Horn et al. | |
| 2009/0156213 A1* | 6/2009 | Spinelli | H04W 92/02 455/436 |
| 2009/0181698 A1 | 7/2009 | Farmer et al. | |
| 2009/0265543 A1 | 10/2009 | Khetawat et al. | |
| 2009/0298515 A1 | 12/2009 | Czaja et al. | |
| 2010/0041364 A1 | 2/2010 | Lott et al. | |
| 2010/0041418 A1 | 2/2010 | Edge et al. | |
| 2010/0056177 A1 | 3/2010 | Kojima | |
| 2010/0120447 A1 | 5/2010 | Anderson et al. | |
| 2010/0130171 A1* | 5/2010 | Palanigounder | H04L 63/0823 455/411 |
| 2010/0190496 A1* | 7/2010 | Chinnathambi | H04W 36/0061 455/435.1 |
| 2010/0240397 A1 | 9/2010 | Buchmayer et al. | |
| 2010/0278108 A1* | 11/2010 | Cho | H04W 76/022 370/328 |
| 2011/0003602 A1 | 1/2011 | Kim et al. | |
| 2011/0013528 A1 | 1/2011 | Chen | |
| 2011/0039577 A1 | 2/2011 | Stern-Berkowitz et al. | |
| 2011/0069674 A1* | 3/2011 | Oswal | H04W 36/04 370/331 |
| 2011/0098057 A1 | 4/2011 | Edge et al. | |
| 2011/0201349 A1* | 8/2011 | Castillo | H04W 64/003 455/456.1 |
| 2011/0250906 A1 | 10/2011 | Siomina et al. | |
| 2011/0256875 A1 | 10/2011 | Edge et al. | |
| 2011/0294506 A1* | 12/2011 | Claussen | H04W 8/10 455/435.1 |
| 2012/0184294 A1* | 7/2012 | Stojanovski | H04W 48/17 455/456.1 |
| 2012/0214539 A1 | 8/2012 | Michel | |
| 2012/0315890 A1* | 12/2012 | Suzuki | H04W 24/10 455/422.1 |
| 2014/0038642 A1 | 2/2014 | Edge | |

FOREIGN PATENT DOCUMENTS

| | | |
|---|---|---|
| JP | 2004502387 A | 1/2004 |
| JP | 2007251357 A | 9/2007 |
| JP | 2009510970 A | 3/2009 |
| JP | 2009200644 A | 9/2009 |
| JP | 2010062770 A | 3/2010 |
| JP | 2010507963 A | 3/2010 |
| JP | 2010518670 A | 5/2010 |
| KR | 20070092538 A | 9/2007 |
| RU | 2263412 C2 | 3/2004 |
| WO | 0152569 A1 | 7/2001 |
| WO | 0203718 A2 | 1/2002 |
| WO | 2007002303 A1 | 1/2007 |
| WO | 2007025143 A1 | 3/2007 |
| WO | 2007035736 A2 | 3/2007 |
| WO | 2007040450 A1 | 4/2007 |
| WO | 2008006055 A2 | 1/2008 |
| WO | 2008051124 A1 | 5/2008 |
| WO | 2008051929 A2 | 5/2008 |
| WO | 2008070842 A1 | 6/2008 |
| WO | 2008093103 A2 | 8/2008 |
| WO | 2009058068 | 5/2009 |
| WO | 2009089486 A1 | 7/2009 |
| WO | WO-2009124206 A2 | 10/2009 |
| WO | 2010022010 A1 | 2/2010 |
| WO | 2010056453 A1 | 5/2010 |

OTHER PUBLICATIONS

3GPP TS 25.453 V9.1.0 ,"3rd Generation Partnership Project; Technical Specification Group Radio Access Network; UTRAN Iupc interface Positioning Calculation Application Part (PCAP) signalling (Release 9)", Apr. 2010.

3rd Generation Partnership Project, Technical Specification Group Radio Access Network, Evolved Universal Terrestrial Radio Access Network (E-UTRAN), Stage 2 Functional specification of User Equipment (UE) positioning in Competence Centre, 650, Route Des Lucioles, F-06921 Sophia-Antipolis Cedex, France, No. V9.1.0, Dec. 28, 2009 (Dec. 28, 2009), pp. 1-52, XP050401613, [retrieved on Dec. 28, 2009].

3rd Generation Partnership Project; Technical Specification Group Services and System Aspects; Evaluation of LCS Control Plane Solutions for EPS (Release 9) 3GPP Standard; 3GPP TR 23.891, 3rd, Generation Partnership Project (3GPP), Mobile Competence Centre ; 650, Route Des Lucioles ; F-06921 Sophia-Anti Poll S Cedex ; France, No. V.9.0.0, Mar. 1, 2009 (Mar. 1, 2009), pp. 1-64, XP050364142, p. 29 p. 35-p. 38.

3rd Generation Partnership Project; Technical Specification Group Services and System Aspects; Evaluation of LCS Control Plane Solutions for EPS (Release 9), 3GPP Standard; 3GPP TR 23.891, 3rd Generation Partnership Project (3GPP), Mobile Competence Centre ; 650, Route Des Lucioles ; F-06921 Sophia-Antipolis Cedex ; France, No. V.0.4.0, Feb. 1, 2009, pp. 1-64, XP050380738.

(56) References Cited

OTHER PUBLICATIONS

3rd Generation Partnership Project; Technical Specification Group Services and System Aspects; Functional stage 2 description of Location Services (LCS) (Release 9), 3GPP Standard; 3GPP TS 23.271, 3rd Generation Partnership Project (3GPP), Mobile Competence Centre ; 650, Route Des Lucioles ; F-06921 Sophia-Antipolis Cedex ; France, No. V9.3.0, Mar. 25, 2010, pp. 1-169, XP050402061, [retrieved on Mar. 25, 2010].

3rd Generation Partnership Project; Technical Specification Group Services and System UTRAN Iupc interface Positioning Calculation Application Part (PCAP) signalling (Release 9), 3GPP Standard; 3GPP TR 23.891, 3rd Generation Partnership Project (3GPP), Mobile Competence Centre ; 650, Route Des Lucioles ; F-06921 Sophia-Antipolis Cedex ; France, No. V9.1.0, Mar. 31, 2010, pp. 1-49, XP055055712, Retrieved from the Internet: URL: www.3gpp.org [retrieved on Mar. 7, 2013].

Ericsson: "LTE positioning protocol architecture", 3GPP Draft, R3-091165, 3RD Generation Partnership Project (3GPP), Mobile Competence Centre, 650, Route Des Lucioles, F-06921 Sophia-Antipolis Cedex, France, No. San Francisco, USA, 20090429, Apr. 29, 2009 (Apr. 29, 2009), XP050341534, [retrieved on Apr. 29, 2009].

Goze T. et al., "Secure User-Plane Location (SUPL) Architecture for Assisted GPS (A-GPS)", 4th Advanced Satellite Mobile Systems (ASMS), Aug. 26, 2008, pp. 229-234, IEEE, Piscataway, NJ, USA, XP031393759, ISBN: 978-1-4244-2160-2.

International Search Report and Written Opinion—PCT/US2011/032567—ISA/EPO—Mar. 19, 2013.

Kim H.S, et al., "Performance Analysis of Position Location Methods based on IS-801 Standard" Proceedings of the Institute of Navigation (ION) GPS, XX, XX, Sep. 22, 2000 (Sep. 22, 2000), pp. 545-553, XP002315981, p. 547, left-hand column, line 1-line 18.

Qualcomm Incorporated, Draft work item proposal: Positioning enhancements for HNB/HeNB, 3GPP TSG RAN Meeting #51, RP-110367, Kansas City, USA, Mar. 15-18, 2011, 5 pages.

Taiwan Search Report—TW100113019—TIPO—Aug. 27, 2013.

Wang S. et al., "Location Based Services for Mobiles: Technologies and Standards", 2008 IEEE International Conference on Communications Workshops, ICC 2008, Workshops Proceedings, [Beijing, China, May 19-23, 2008], IEEE, Piscataway, NJ, May 19, 2008 (May 19, 2008), pp. 1-123, XP002633307, ISBN: 978-1-4244-2051-3 Retrieved from the Internet: URL: http://to.swang.googlepages.com/ICC2008LBSforMobilessimplifiedR2.pdf [retrieved on Apr. 18, 2011].

\* cited by examiner

METHOD AND APPARATUS FOR SUPPORTING LOCATION SERVICES VIA A HOME NODE B (HNB)

CROSS-REFERENCE TO RELATED APPLICATIONS

The present Application for Patent is a divisional of U.S. patent application Ser. No. 13/085,395, entitled "METHOD AND APPARATUS FOR SUPPORTING LOCATION SERVICES VIA A HOME NODE B (HNB)," filed Apr. 12, 2011, which claims the benefit of U.S. Provisional Application No. 61/324,156, entitled HNB Location," filed Apr. 14, 2010, both of which are assigned to the assignee hereof, and expressly incorporated herein by reference.

BACKGROUND

I. Field

The present disclosure relates generally to communication, and more specifically to techniques for supporting location services via a Home Node B (HNB) in a wireless network.

II. Background

HNBs are home base stations (sometimes referred to as femtocells or femto base stations) that are becoming increasingly popular and more widely deployed at various locations such as homes, offices, shops, apartments, etc. These HNBs typically serve as base stations for a wireless network operator (normally using licensed radio frequencies) and may be used to improve radio coverage, increase throughput, and/or provide other benefits for the network operator and/or users. Unlike macro base stations that are carefully deployed at specific locations and maintained by network operators, HNBs may be flexibly deployed in an unplanned manner at any location by users.

An HNB may support communication for one or more user equipments (UEs) within its coverage. It may be desirable to know the location of the HNB or a UE communicating with the HNB. For example, it may be necessary to know the location of the HNB in order to ensure that it is authorized to operate at its current location (e.g., is within a geographic area for which the associated network operator has a license to use the radio frequencies supported by the HNB). As another example, the user of a UE may place an emergency call using the UE. The location of the UE may then be determined and used to send emergency assistance to the user. There are many other scenarios in which knowledge of the location of the UE or the HNB is useful or necessary.

A device (e.g., an HNB or a UE) may have capability to autonomously determine its location without any assistance from a network. For example, the device may support standalone Global Navigation Satellite System (GNSS) and may be able to determine its location based on signals received from satellites in a GNSS. A location estimate obtained with standalone GNSS may have good accuracy. However, standalone GNSS may have some disadvantages such as a relatively long time to first fix (TTFF), inability to detect satellites with very low signal strength, etc. Hence, techniques that can improve performance over standalone GNSS for HNBs and UEs may be highly desirable.

SUMMARY

Techniques for supporting location services for HNBs and UEs communicating with the HNBs are described herein. A location service may include assisted GNSS (A-GNSS), which may have certain advantages over standalone GNSS.

In an aspect, location services may be supported for a UE communicating with an HNB by having the HNB inter-work between a user plane location solution and a control plane location solution. In one design, the HNB may receive a request for a location service for a UE. The HNB may communicate with a location server via a user plane location solution to support the location service for the UE. The HNB may also communicate with the UE via a control plane location solution to support the location service for the UE. The HNB may inter-work between the user plane location solution and the control plane location solution, as described below. This scheme may also be performed by other network entities (besides HNBs) to support location services for UEs.

In another aspect, a location server may be used to support location services and A-GNSS for HNBs and UEs. The location server may be coupled to an HNB Gateway (HNB GW), which may be seen as a Radio Network Controller (RNC) by the location server. In one design, an HNB may receive a request for a location service for a UE. The HNB may exchange Positioning Calculation Application Part (PCAP) messages with the location server via the HNB GW to support the location service for the UE. The PCAP messages may be transferred (i) in messages of a first protocol between the HNB and the HNB GW and (ii) in messages of a second protocol between the HNB GW and the location server. The HNB may exchange Radio Resource Control (RRC) messages with the UE to support the location service for the UE.

Various aspects and features of the disclosure are described in further detail below.

DETAILED DESCRIPTION

Figure 1:
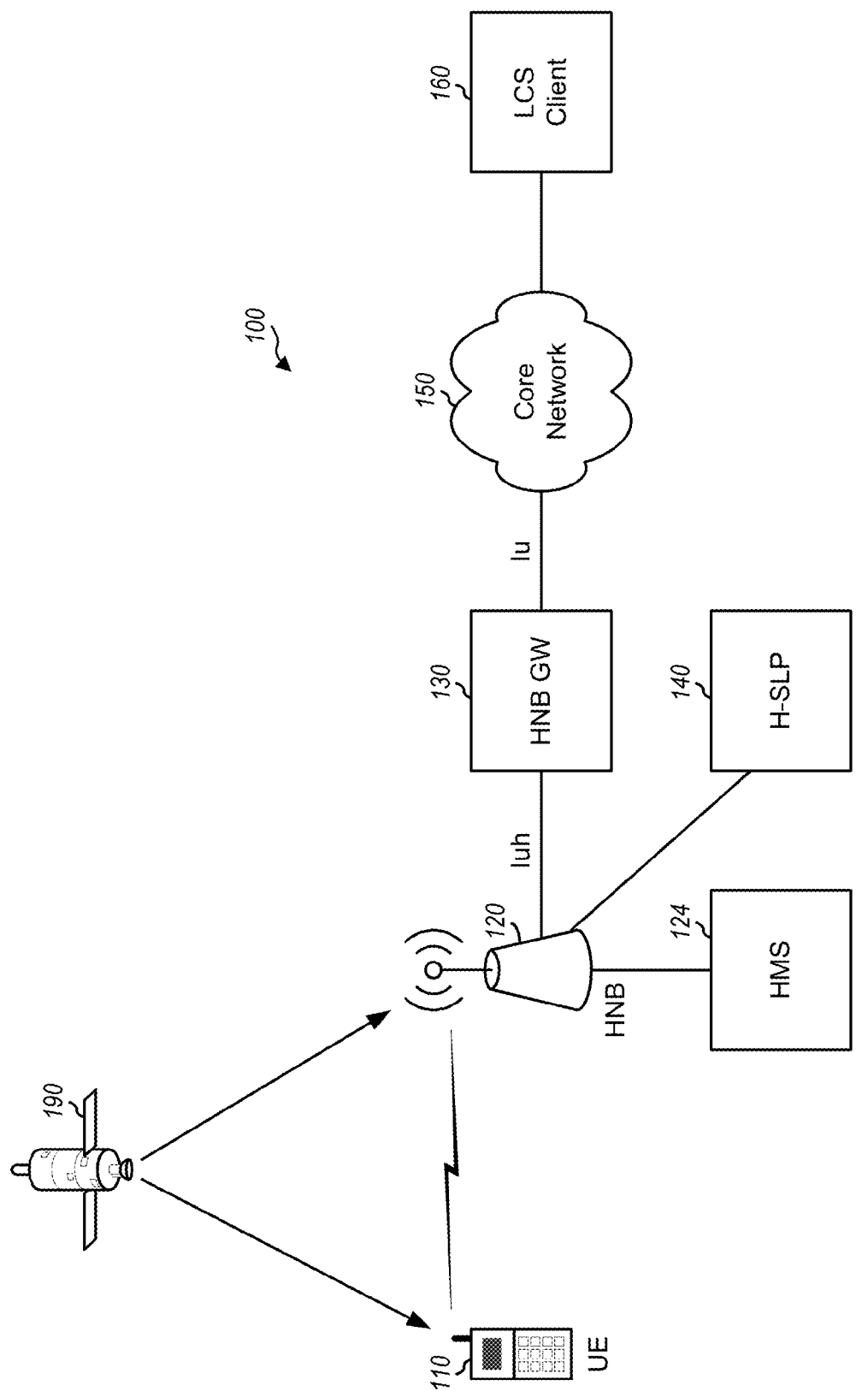
FIG. 1 shows an exemplary wireless network.

The techniques described herein for supporting location services for devices (e.g., HNBs and UEs) may be used for various wireless networks and radio technologies, including those defined by organizations named "3rd Generation Partnership Project" (3GPP) and "3rd Generation Partnership Project 2" (3GPP2). For example, the techniques may be used for a Wideband Code Division Multiple Access (WCDMA) network implementing Universal Terrestrial Radio Access (UTRA) defined by 3GPP, a Long Term Evolution (LTE) network implementing Evolved Universal Terrestrial Radio Access (E-UTRA) defined by 3GPP, etc. WCDMA is part of Universal Mobile Telecommunication System (UMTS). LTE is part of 3GPP Evolved Packet System (EPS). WCDMA, LTE, UTRA, E-UTRA, UMTS and EPS are described in documents from 3GPP. The techniques may also be used for other wireless networks (e.g., 3GPP and 3GPP2 networks) and other radio technologies.

The techniques described herein may also be used for various user plane and control plane location solutions/architectures that can support location services. Location services refer to any services based on or related to location information. Location information may include any information related to the location of a device, e.g., a location estimate, measurements, etc. Location services may include positioning, which refers to a functionality that determines a geographical location of a target device. Location services may also include activities that assist positioning such as transfer of assistance data to a UE to assist the UE to make location related measurements and determine its own location.

A user plane location solution is a location solution or system that sends messages for location services via a user plane. A user plane is a mechanism for carrying signaling and data for higher-layer applications and employing a user-plane bearer, which is typically implemented with standard protocols such as User Datagram Protocol (UDP), Transmission Control Protocol (TCP), and Internet Protocol (IP). A control plane location solution is a location solution that sends messages for location services via a control plane. A control plane is a mechanism for carrying signaling for higher-layer applications and is typically implemented with network-specific protocols, interfaces, and signaling messages. Messages supporting location services are carried as part of signaling in a control plane location solution and as part of traffic data (from a network perspective) in a user plane location solution. The content of the messages may, however, be the same or similar in both user plane and control plane location solutions. An example of user plane location solution includes Secure User Plane Location (SUPL) from Open Mobile Alliance (OMA). Some examples of control plane location solutions include (i) a 3GPP control plane location solution described in 3GPP TS 23.271, TS 43.059, TS 25.305, and TS 36.305 and (ii) a 3GPP2 control plane location solution described in IS-881 and X.S0002.

The techniques described herein may also be used for various positioning protocols such as (i) LTE Positioning Protocol (LPP), Radio Resource LCS Protocol (RRLP), and Radio Resource Control (RRC) defined by 3GPP, (ii) C.S0022 (also known as IS-801) defined by 3GPP2, and (iii) LPP Extensions (LPPe) defined by OMA. A positioning protocol may be used to coordinate and control positioning of devices. A positioning protocol may define (i) procedures that may be executed by a location server and a device being positioned and (ii) communication or signaling between the device and the location server.

FIG. 1 shows a wireless network 100 that supports communication and location services. An HNB 120 may be deployed by a user at any location (e.g., a home) to support radio communication for UEs within the coverage of HNB 120. An HNB may also be referred to as a home base station, a femto access point (FAP), a home evolved Node B (HeNB), etc. HNB 120 may support radio access using WCDMA or some other radio technology.

A Home Management System (HMS) 124 may configure HNB 120 and other HNBs for operation, e.g., as defined by a network operator with which HNB 120 is registered. An HNB Gateway (GW) 130 may be coupled to HNB 120 and other HNBs and may support inter-working between the HNBs and other network entities. A core network 150 may include various network entities supporting various functions and services for wireless network 100. For example, core network 150 may include a Mobile Switching Center (MSC), a Serving GPRS Support Node (SGSN), and/or other network entities. An MSC may perform switching functions for circuit-switched (CS) calls and may also route Short Message Service (SMS) messages. A SGSN may perform signaling, switching and routing functions for packet-switched (PS) connections and sessions for UEs. Core network 150 may have access to other networks, e.g., other wireless networks and/or the Internet.

A Home SUPL Location Platform (H-SLP) 140 may support positioning and location services. H-SLP 140 may include a SUPL Location Center (SLC) and possibly a SUPL Positioning Center (SPC). The SLC may perform various functions for location services, coordinate the operation of SUPL, and interact with SUPL enabled terminals (SETs). The SPC may support positioning for SETs and delivery of assistance data to the SETs and may also be responsible for messages and procedures used for position calculation. A location services (LCS) client 160 may be an entity that desires location information and may communicate with a network entity within core network 150 to obtain the location information. LCS client 160 may be external to a UE and in communication with core network 150 (as shown in FIG. 1), or resident on the UE, or in communication with the UE.

For simplicity, FIG. 1 shows only some network entities that may be present in wireless network 100. Wireless network 100 may include other network entities. For example, a Security Gateway (SeGW) may be coupled between HNB 120 and HNB GW 130 and may provide security (e.g., to the rest of the network) for access via HNB 120. Wireless network 100 may also include Radio Network Controllers (RNCs), Base Station Controllers (BSCs), base stations, Mobility Management Entity (MMEs), etc., which may perform functions described in publicly available documents from 3GPP and 3GPP2.

A UE 110 may be one of many UEs supported by wireless network 100. UE 110 may be stationary or mobile and may also be referred to as a mobile station, a terminal, an access terminal, a subscriber unit, a station, a SET, etc. UE 110 may be a cellular phone, a personal digital assistant (PDA), a wireless device, a wireless modem, a laptop computer, a smartphone, a netbook, a smartbook, a tablet, a telemetry device, a tracking device, etc. UE 110 may be able to communicate with HNBs and macro base stations to obtain communication services. UE 110 may also support one or more positioning methods such as A-GNSS, Observed Time Difference of Arrival (OTDOA), Uplink Time Difference of Arrival (U-TDOA), Enhanced Cell Identity (E-CID), etc. Any one of these positioning methods may be used to determine the location of UE 110.

UE 110 and/or HNB 120 may receive and measure signals from one or more satellites 190 and may obtain pseudo-range measurements for the satellites. Satellites 190 may be part of a GNSS, which may be the United States Global Positioning System (GPS), the European Galileo system, the Russian GLONASS system, or some other GNSS. In the description herein, the term "GNSS" generically refers to any satellite system or any combination of satellite systems supporting positioning, such as GPS, Galileo, GLONASS, etc. UE 110 and/or HNB 120 may also measure signals from macro base stations and/or HNBs (not shown in FIG. 1) and obtain timing measurements, signal strength measurements, signal quality measurements, and/or identification information for the base stations and/or HNBs. The measurements for satellites, base stations, and/or HNBs and possibly the identification information for base stations and/or HNBs may be used to derive a location estimate for UE 110 or HNB 120. A location estimate may also be referred to as a position estimate, a position fix, etc.

HNB 120 may support standalone GNSS and may be able to determine its location based on its standalone GNSS capability. UE 110 may also support standalone GNSS and may be able to determine its location based on its standalone GNSS capability. Alternatively, if UE 110 does not support standalone GNSS, then the location of UE 110 may be estimated based on the location of HNB 120. In any case, standalone GNSS may be able to provide an accurate location estimate but may have some disadvantages. For example, standalone GNSS may require the signal strength of the best satellite to be about −145 dBm or better in order to demodulate navigation data. Furthermore, the time to first fix (TTFF) for standalone GNSS may be on the order of minutes or longer at low signal strength.

Assisted GNSS (A-GNSS) may provide better performance than standalone GNSS and/or may ameliorate some of the disadvantages of standalone GNSS. For A-GNSS, a device may obtain assistance data for satellites from a network and may use the assistance data to search and acquire satellites. The assistance data may enable the device to more quickly detect satellites, to detect satellites at a lower received signal level, to avoid having to demodulate satellite navigation data, etc. For example, A-GNSS may work even when the signal strength of the best satellite is about −155 dBm, which may be about 10 dB better than standalone GNSS. TTFF may be on the order of tens of seconds for A-GNSS instead of minutes for standalone GNSS. The increased sensitivity and lower minimum signal strength for A-GNSS may be especially desirable for HNBs, which are likely to be deployed indoors. The shorter TTFF may provide better user experience.

In an aspect, location services may be supported for a UE communicating with an HNB by having the HNB inter-work between user plane and control plane location solutions. The HNB may support a user plane location solution such as SUPL. The UE may support the control plane location solution and RRC positioning protocol from 3GPP. The HNB may inter-work to allow the UE to obtain network assistance for positioning and location services via SUPL.

Figure 2:
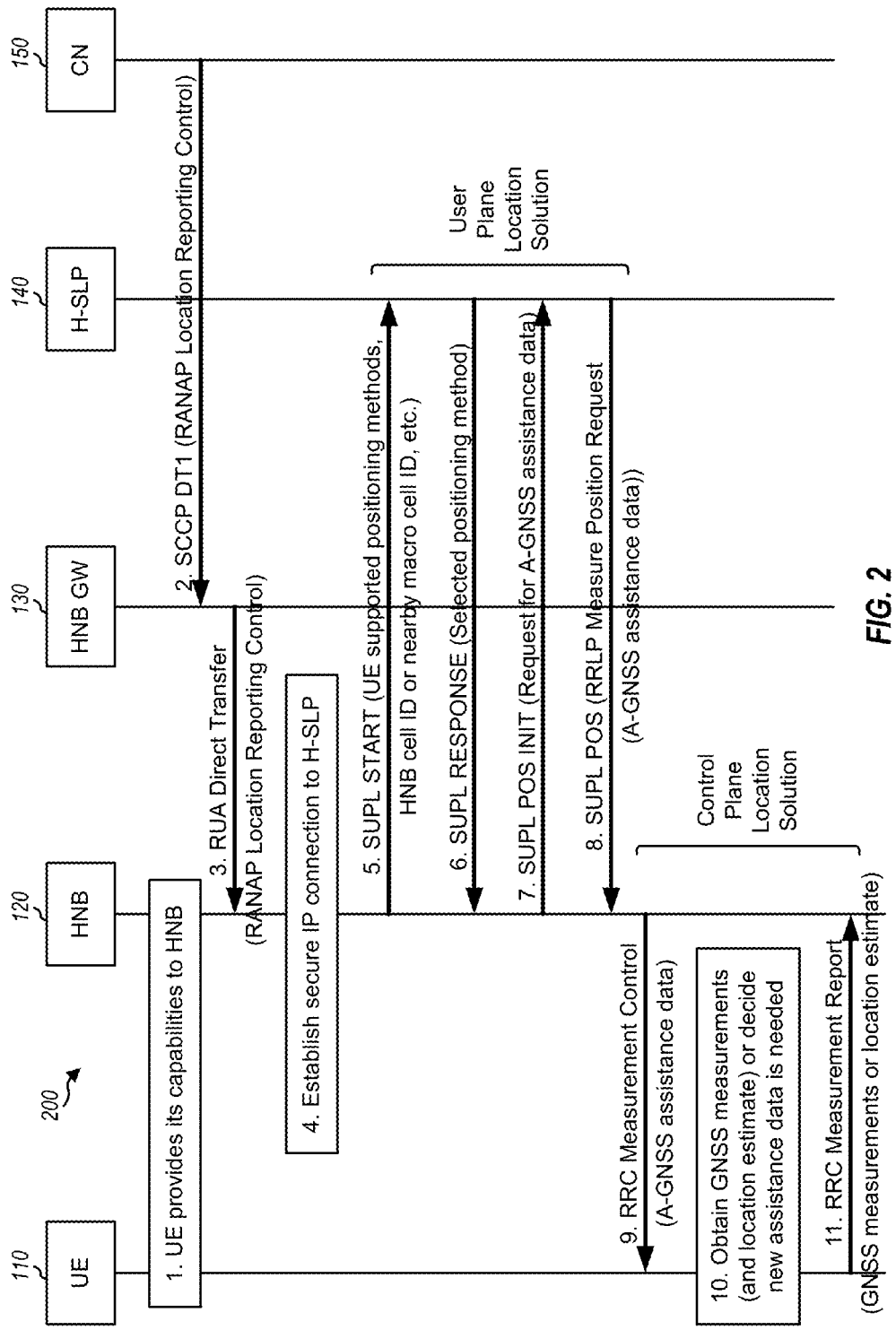
FIG. 2 shows a message flow for supporting location service for a UE with inter-working between user plane and control plane location solutions by an HNB.
Figure 2:
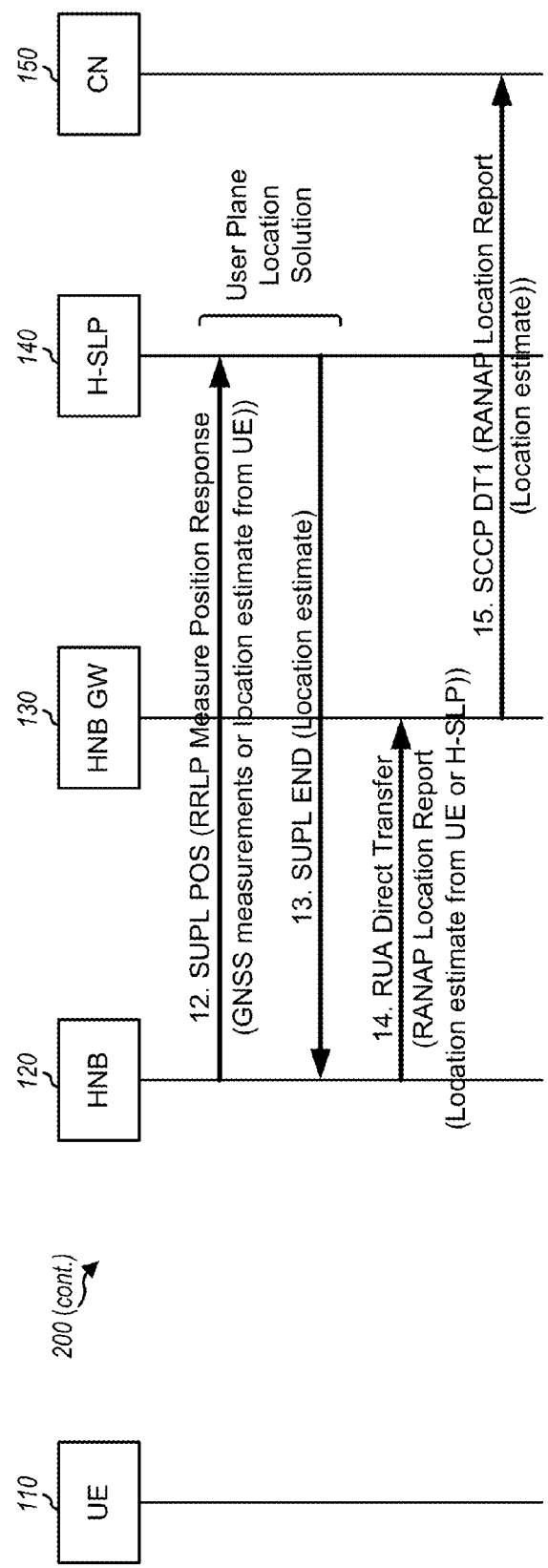

FIG. 2 shows a design of a message flow 200 for supporting location services and A-GNSS for UE 110 with inter-working between user plane and control plane location solutions by HNB 120, which may support WCDMA radio access. UE 110 may establish a signaling connection with HNB 120 (e.g., after being paged by HNB 120 for the purpose of obtaining its location) and may provide its positioning capabilities to HNB 120 (step 1). For example, UE 110 may provide its positioning capabilities to HNB 120 in a UE Positioning Capability Information Element (IE) contained in a UE Radio Access Capability IE in an RRC Connection Setup Complete message when the signaling connection to HNB 120 is established, as defined in 3GPP TS 25.331. The UE positioning capabilities may include (i) the positioning methods (e.g., UE-assisted A-GNSS, UE-based A-GNSS, UE-assisted OTDOA, UE-based OTDOA, etc.) supported by UE 110 and (ii) where A-GNSS is supported, the particular GNSS systems and GNSS signals supported by UE 110.

LCS client 160 may desire to obtain the location of UE 110 and may send a request to a network entity in core network 150. The request may include a required Quality of Service (QoS) or Quality of Positioning (QoP). Core network 150 may then send a Radio Access Network Application Part (RANAP) Location Reporting Control message to request information on the location of UE 110 (step 2). RANAP is a protocol used for an Iu interface between core network 150 and HNB GW 130. The RANAP Location Reporting Control message may include the requested QoP or QoS and may be carried in a Signaling Connection Control Part (SCCP) Data Form 1 (DT1) message for transfer from core network 150 to HNB GW 130. HNB GW 130 may receive the SCCP DT1 message from core network 150 and may forward the RANAP Location Reporting Control message in a RANAP User Adaptation (RUA) Direct Transfer message to HNB 120 (step 3). RUA is a protocol used for an Iuh interface between HNB 120 and HNB GW 130 and is defined in 3GPP TS 25.468. HNB 120 may receive the RUA Direct Transfer message, extract the RANAP Location Reporting Control message, and determine that information on the location of UE 110 is requested.

HNB 120 may support SUPL and may be able to communicate with H-SLP 140 for positioning and location services. Communication between HNB 120 and H-SLP 140 may be via a direct signaling link or via one or more networks and/or network entities, e.g., via HNB GW 130, core network 150, the Internet, etc. HNB 120 may also be able to communicate with UE 110 via RRC to support positioning and location services for UE 110 according to a control plane location solution, e.g., the location solution defined in 3GPP TS 25.305. In one design, HNB 120 may inter-work between SUPL and 3GPP control plane location solution to support positioning and location service for UE 110. For inter-working, HNB 120 may communicate with H-SLP 140 as if it was UE 110. Alternatively, HNB 120 may communicate with H-SLP 140 as a subscribed SET of H-SLP 140 but may present to H-SLP 140 the positioning capabilities of UE 110 rather than the positioning capabilities of HNB 120. HNB 120 may also transfer pertinent information received from H-SLP 140 to UE 110 and may transfer pertinent information received from UE 110 to H-SLP 140.

HNB 120 may establish a secure IP connection to H-SLP 140 (step 4). HNB 120 may use its own security and identification information to establish this secure IP connection, e.g., may appear to H-SLP 140 to be a SUPL SET with subscription to SUPL service from H-SLP 140. HNB 120 may then send a SUPL START message to initiate a location session with H-SLP 140 (step 5). The SUPL START message may include a session-id, a cell-id, positioning capabilities, a desired QoP, etc. The session-id may be used to identify the location session. The cell-id may be a cell identifier (ID) of HNB 120, or a cell ID of a nearby macro cell, or both. The positioning capabilities may include some or all of the positioning methods supported by UE 110 that were reported to HNB 120 in step 1. The positioning capabilities may also indicate the positioning protocols supported by (i) HNB 120 but not UE 110 or (ii) UE 110 but not HNB 120 or (iii) both HNB 120 and UE 110. For WCDMA access and control plane location, UE 110 would normally support only RRC positioning protocol. Positioning protocols for case (i) may include RRLP or LPP, and positioning protocols for case (ii) and case (ii) may include RRC. The desired QoP may be the same as that received by HNB 120 in step 3. A sender of a SUPL START message typically includes the positioning capabilities of the sender and the QoP desired by the sender. However, HNB 120 may act as a proxy to assist positioning for UE 110 and LCS client 160 and may thus include the positioning capabilities of UE 110 (and not those of HNB 120) and the QoP desired by LCS client 160 in the SUPL START message. HNB 120 may also indicate support for one or more positioning protocols that it supports but that UE 110 does not support (for case (i) above) or may indicate support for one or more positioning protocols that UE 110 supports (for cases (ii) and (iii) above). H-SLP 140 may receive the SUPL START message, select one of the supported positioning methods, and return a SUPL RESPONSE message that may include the session-id, the selected positioning method, etc. (step 6).

HNB 120 may send a SUPL POS INIT message that may include the session-id, a request for assistance data for A-GNSS, the positioning capabilities as in step 5, the HNB cell ID and/or a nearby macro cell ID, and possibly other information to H-SLP 140 (step 7). H-SLP 140 may then return a SUPL POS message that may include the session-ID, a positioning message containing the requested assistance data, and possibly a request for measurements, etc. (step 8). The positioning message may conform to one of the positioning protocols included in the positioning capabilities sent in step 5 and/or step 7. For example, if RRLP was included in the positioning capabilities, then the positioning message may be an RRLP Measure Position Request message as shown in FIG. 2. Alternatively, the positioning message may be some other message for RRLP (e.g., an Assistance Data message) or a message for some other positioning protocol (not shown in FIG. 2). Once H-SLP 140 starts to use a particular positioning protocol in step 8, the same positioning protocol will normally be used to encode other positioning messages (e.g., in step 12) transferred between HNB 120 and H-SLP 140 for this SUPL positioning session.

HNB 120 may obtain the assistance data from the positioning message contained in the SUPL POS message and may send the assistance data in an RRC Measurement Control message to UE 110 (step 9). If the positioning message did not conform to the RRC positioning protocol (e.g., was an RRLP Measure Position Request message as shown in FIG. 2), then HNB 120 may decode the positioning message, extract the assistance data, and then send the assistance data in an RRC Measurement Control message. Conversely, if the positioning message was already an RRC Measurement Control message, then HNB 120 may send on this message with little or no interpretation or modification.

UE 110 may obtain GNSS measurements (i.e., measurements for satellites) based on the assistance data (step 10). UE 110 may or may not be able to determine a location estimate based on the GNSS measurements. UE 110 may send to HNB 120 an RRC Measurement Report message that may include the GNSS measurements or location estimate obtained by UE 110 (step 11). HNB 120 may then forward the GNSS measurements or location estimate in an RRLP Measure Position Response message, which may be carried in a SUPL POS message sent to H-SLP 140 (step 12). For step 12, HNB 120 may decode the RRC Measurement Report message received from UE 110, extract the GNSS measurements or location estimate, and send the GNSS measurements or location estimate in the RRLP Measure Position Response message. However, if UE 110 had indicated support for RRC and had earlier received an RRC Measurement Control message from H-SLP 140 in step 8, then HNB 120 may transfer the RRC Measurement Report message received from UE 110 in step 11 to H-SLP 140 in step 12 with little or no interpretation or modification. If GNSS measurements are sent to H-SLP 140, then H-SLP 140 may compute a location estimate for UE 110 based on the GNSS measurements. H-SLP 140 may then send a SUPL END message that may include the location estimate computed by H-SLP 140 (step 13). If a location estimate is sent to H-SLP 140, then H-SLP 140 may simply return a SUPL END message.

HNB 120 may receive the location estimate for UE 110 from either UE 110 in step 11 or H-SLP 140 in step 13. HNB 120 may send the location estimate for UE 110 in a RANAP Location Report message, which may be carried in a RUA Direct Transfer message sent to HNB GW 130 (step 14). HNB GW 130 may forward the RANAP Location Report message in a SCCP DT1 message to core network 150 (step 15). Core network 150 may then transfer the location estimate to LCS client 160.

For simplicity, FIG. 2 shows a transfer of assistance data for A-GNSS from H-SLP 140 to UE 110 in steps 8 and 9. UE 110 may determine that it needs new assistance data in step 10. In this case, UE 110 may send a request for new assistance data to HNB 120, which may forward the request in a SUPL POS message to H-SLP 140. HNB 120 may thereafter receive a SUPL POS message containing new assistance data from H-SLP 140 and may forward the new assistance data to UE 110, e.g., in similar manner as steps 8 and 9 in FIG. 2.

As shown in FIG. 2, a network operator may support both control plane and user plane location solutions. HNB 120 may inter-work between SUPL and 3GPP control plane location solution in order to support location of UE 110. Furthermore, HNB 120 may inter-work the RRLP positioning protocol used by SUPL with the RRC positioning protocol used by UE 110. If H-SLP 140 uses RRC instead of RRLP (which may occur if HNB 120 includes support for RRC as part of its positioning capabilities in steps 5 and 7), then no inter-working between RRLP and RRC would be needed, and HNB 120 may transfer RRC positioning messages between UE 110 and H-SLP 140 with little or no interpretation and modification. In any case, the inter-working by HNB 120 may allow the UE location to be obtained explicitly (e.g., with A-GNSS), instead of having to use the HNB location as the UE location.

When HNB 120 receives a control plane location request from a network entity (e.g., an MSC or a SGSN) for the UE location, HNB 120 may instigate a SUPL location session with H-SLP 140 in its own network (or possibly an SLP in another network). HNB 120 may indicate to H-SLP 140 that it supports the same positioning methods (e.g., A-GNSS) that UE 110 supports and may request for assistance data for A-GNSS. HNB 120 may transfer the assistance data received from H-SLP 140 to UE 110. If UE 110 requests more assistance data (e.g., using RRC), then HNB 120 may send the request to H-SLP 140 using RRLP and may transfer the new assistance data received from H-SLP 140 to UE 110. Similarly, if HNB 120 receives another request from H-SLP 140 in a positioning message carried within a SUPL POS message for more location-related measurements or another location estimate from UE 110, then HNB 120 may transfer this request to UE 110 (either by converting the request to an RRC message if the positioning protocol used by H-SLP 140 is not RRC or by forwarding the request if RRC is used). HNB 120 may return to H-SLP 140 the resulting location-related measurements or location estimate as in steps 8 to 12.

Once HNB 120 receives location-related measurements or a location estimate from UE 110, HNB 120 may retain any location estimate and transfer any location-related measurements to H-SLP 140 using RRLP (as shown in FIG. 2) or some other positioning protocol (not shown in FIG. 2) and SUPL. H-SLP 140 may calculate a location estimate for UE 110 based on the location-related measurements (if provided) and may return the location estimate to HNB 120 in a SUPL END message. HNB 120 may send the location estimate received from UE 110 or H-SLP 140 to the requesting network entity (e.g., the MSC or SGSN).

FIG. 2 shows positioning of UE 110 using A-GNSS. The exemplary procedure shown in FIG. 2 may also be used to position UE 110 using other positioning methods (e.g., OTDOA or E-CID) in addition to or instead of A-GNSS by (i) requesting and returning assistance data for these other positioning methods in steps 7 to 9 and (ii) requesting and returning measurements or a location estimate for these other positioning methods in steps 8 to 12. Furthermore, FIG. 2 may show the use of SUPL 1.0 or SUPL 2.0 between HNB 120 and H-SLP 140. By using other SUPL messages and parameters in one or more of steps 5, 6, 7, 8, 12 and 13, other versions of SUPL (e.g., SUPL 3.0) may be used. By replacing HNB 120 and HNB GW 130 and the link between them by a single RNC and removing steps 3 and 14, a procedure may be obtained for positioning a UE in a macro cell by inter-working SUPL with control plane location at an RNC instead of HNB 120. The principle of inter-working user plane location and control plane location may also be employed at other entities that serve as anchor points for control plane location, e.g., may be used a MSC, a SGSN, or a MME.

FIG. 2 shows a design of supporting A-GNSS for UE 110. A-GNSS may be supported for HNB 120 in various manners. In one design, HNB 120 may query H-SLP 140 to obtain its own location using SUPL. HNB 120 may instigate a SUPL positioning session with H-SLP 140 and may behave as a SET when interacting with H-SLP 140 using SUPL. In another design, HMS 124 may provide assistance data for A-GNSS to HNB 120, e.g., using a proprietary signaling method, thereby enabling HNB 120 to obtain its own location from GNSS measurements made by HNB 120. In yet another design, a proprietary server (e.g., a server provided by the manufacturer of HNB 120 or by an OEM for this manufacturer) may provide assistance data to HNB 120 at initialization or subsequently. HNB 120 may also obtain assistance data in other manners. HNB 120 may perform positioning using the assistance data obtained via any suitable mechanism.

In another aspect, a Standalone Serving Mobile Location Center (SAS) or some other location server may be used to support location services and A-GNSS for HNBs and UEs. A SAS may typically be used in a 3GPP network, may be coupled to an RNC via an Iupc interface, and may support positioning for UEs communicating with the 3GPP network. However, to support positioning for HNBs and UEs, a SAS may be coupled to an HNB GW, which may be seen as an RNC by the SAS.

Figure 3:
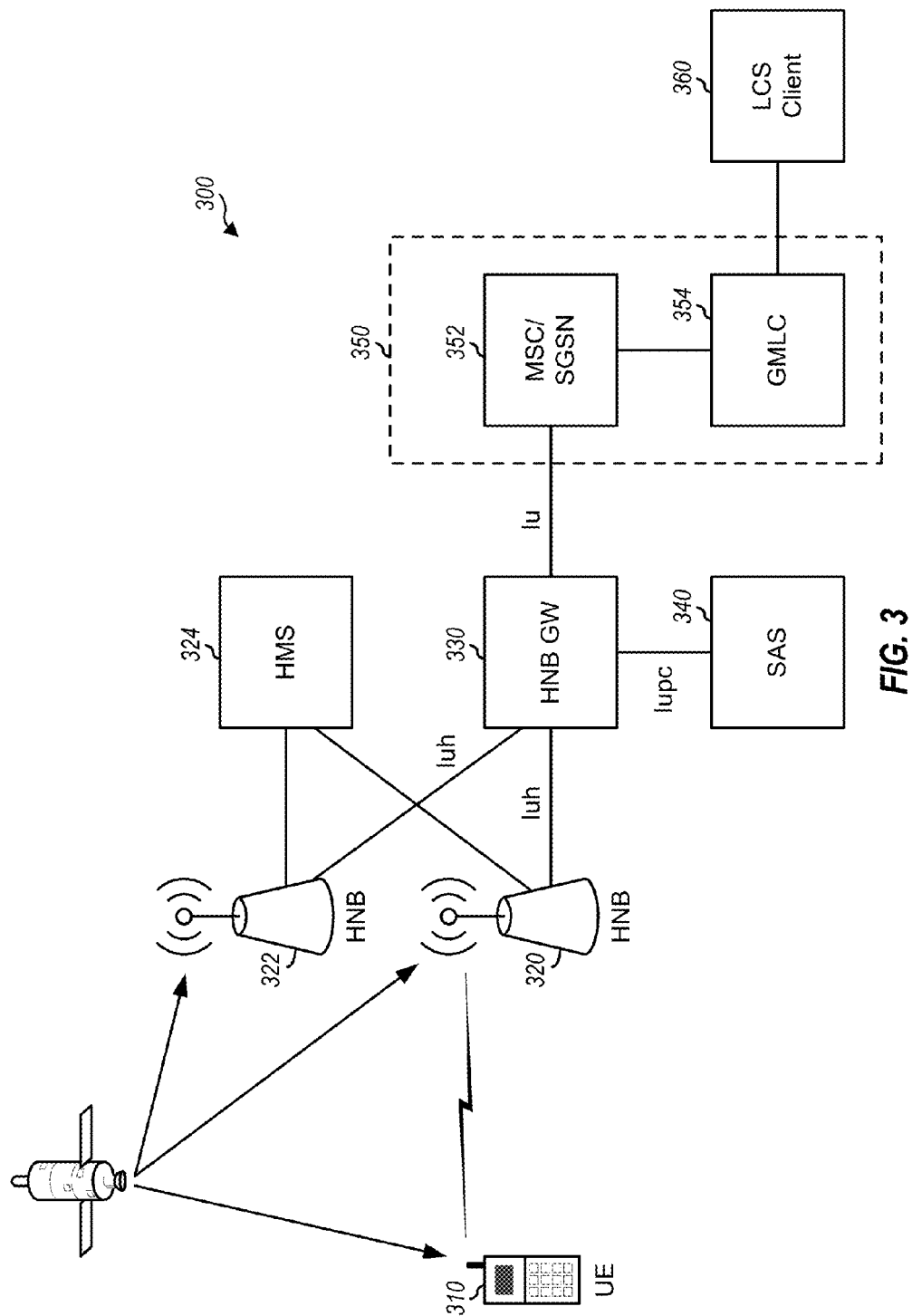
FIG. 3 shows another exemplary wireless network.

FIG. 3 shows a wireless network 300 that supports communication and location services. HNBs 320 and 322 may be deployed by one or more users at different locations (e.g., two stories of a building) to support radio communication for UEs within the coverage of these HNBs. An HMS 324 may configure HNBs 320 and 322 for operation. An HNB GW 330 may be coupled to HNBs 320 and 322 and may support inter-working between the HNBs and other network entities. A SAS 340 may support location services and positioning for UEs communicating with network 300. A core network 350 may include a MSC/SGSN 352 and a Gateway Mobile Location Center (GMLC) 354. GMLC 354 may perform various functions to support location services, interface with an LCS client 360, and provide services such as subscriber privacy, authorization, authentication, billing, etc. For simplicity, FIG. 3 shows only some network entities that may be present in wireless network 300. Wireless network 300 may include other network entities. A UE 310 may be one of many UEs supported by wireless network 300.

Figure 4:
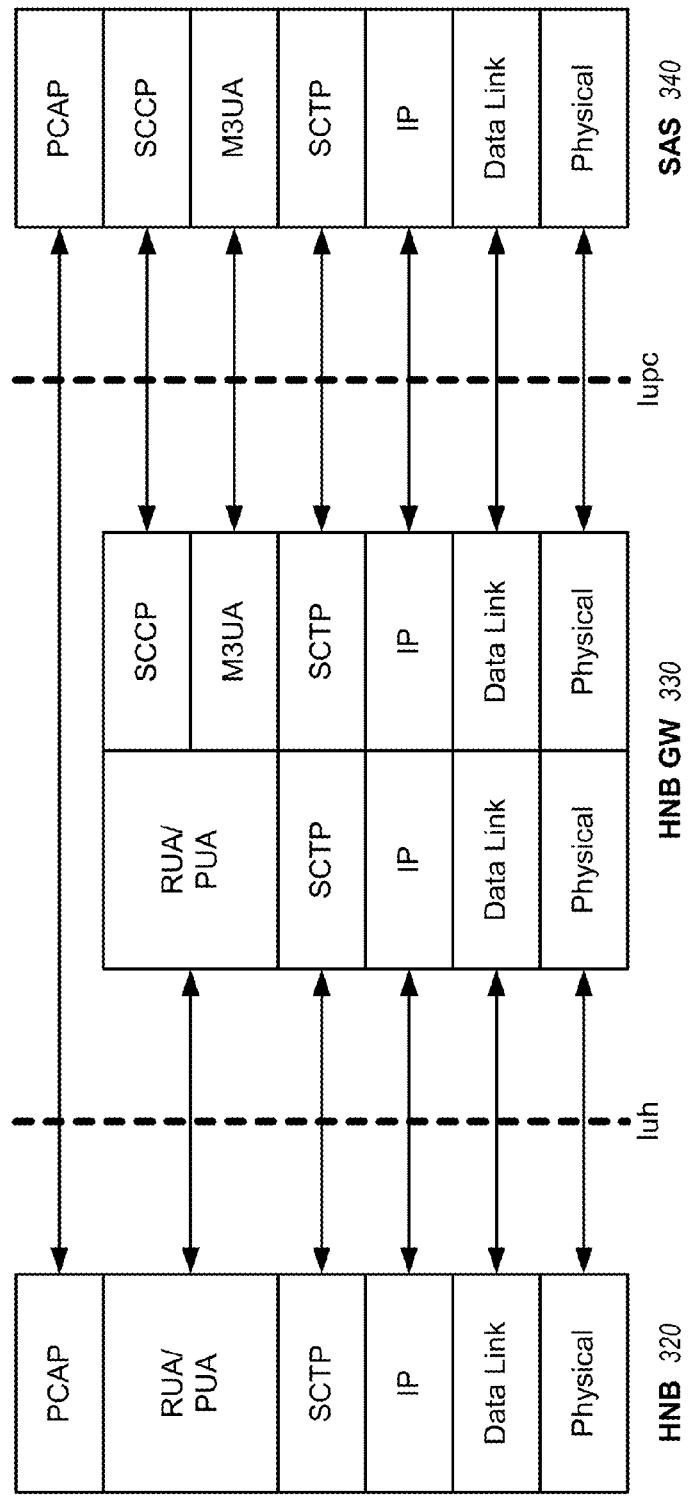
FIG. 4 shows exemplary protocol stacks at various network entities in FIG. 3.

FIG. 4 shows exemplary protocol stacks at HNB 320, HNB GW 330, and SAS 340. HNB 320 and SAS 340 may communicate end-to-end via Positioning Calculation Application Part (PCAP), which may reside at the top of the protocol stacks for HNB 320 and SAS 340. PCAP is a protocol used to support positioning with the 3GPP control plane for WCDMA access and may be used between an RNC and a SAS. PCAP is defined in 3GPP TS 25.453, which is publicly available. The protocol stacks for HNB 320 and HNB GW 330 via an Iuh interface may include RUA or PCAP User Adaptation (PUA) protocol, Stream Control Transmission Protocol (SCTP), IP, a data link layer, and a physical layer. The protocol stacks for HNB GW 330 and SAS 340 via an Iupc interface may include SCCP, MTP3-User Adaptation (M3UA), SCTP, IP, a data link layer, and a physical layer.

As shown in FIG. 4, PCAP may be added in the control plane, and PCAP messages may be transferred via HNB GW 330 using PUA/RUA on the Iuh interface and SCCP on the Iupc interface. HNB GW 330 may terminate Iupc protocols below PCAP for SAS 340 and may also terminate Iuh protocols below PCAP for HNB 320. Although not shown in FIG. 4, HNB GW 330 may also terminate Iu protocols below RANAP from MSC/SGSN 352.

When HNB 320 first accesses network 300, location-related information may be verified and configured in HNB 320. HNB 320 may report its positioning capabilities to HMS 324. HMS 324 may configure which positioning capabilities can be used, e.g., A-GNSS, E-CID, broadcast, RNC-centric mode versus SAS-centric mode, etc. HMS 324 may also provide HNB 320 with the identities and capabilities of SAS 340 and/or other SAS that may be accessible from HNB GW 330. HNB 320 may make use of SAS 340 to more accurately determine its location and to report or update this location in HMS 324. Alternatively, HNB 320 may register with HNB GW 330, which may perform the functions described above.

In one design, SAS 340 may store a database of HNB information for HNBs that can be served by SAS 340. The HNB information stored by SAS 340 for HNB 320 may include a cell global ID (CGI) that can uniquely identify HNB 320, location coordinates for HNB 320, cell IDs and possibly signal strengths of neighbor cells near the vicinity of HNB 320, positioning capabilities of HNB 320, etc. HNB 320 may send HNB information to SAS 340 when HNB 320 is first initialized, or after HNB 320 has registered with HNB GW 330, or when HNB 320 changes location, or periodically, etc. In one design, HNB 320 may send HNB information in a new connectionless PCAP message to SAS 340. In another design, HNB 320 may send HNB information in an existing PCAP message (e.g., a PCAP Position Initiation Request message) to SAS 340 to obtain location support from the SAS. HNB 320 may identify to SAS 340 that information being sent (e.g., in a PCAP Position Initiation Request message) is related to HNB 320 by including an identification parameter in the message. The identification parameter may comprise an International Mobile Subscriber Identity (IMSI) or an International Mobile Equipment Identity (IMEI) and may contain a string of digits belonging to a set of such strings reserved by the operator of network 300 to identify HNBs. If this set of digit strings (e.g., defined by a range of values) is previously configured in SAS 340, then SAS 340 can recognize the identification parameter and hence infer that the information in the PCAP message as related to an HNB. This may enable existing PCAP messages and parameters to be used to convey HNB information from HNB 320 to SAS 340 and may avoid the need to standardize and implement new PCAP messages and parameters. HNB 320 may also send HNB information to SAS 340 in other manners. SAS 340 may store the HNB information as semi-permanent information or semi-static information.

Figure 5:
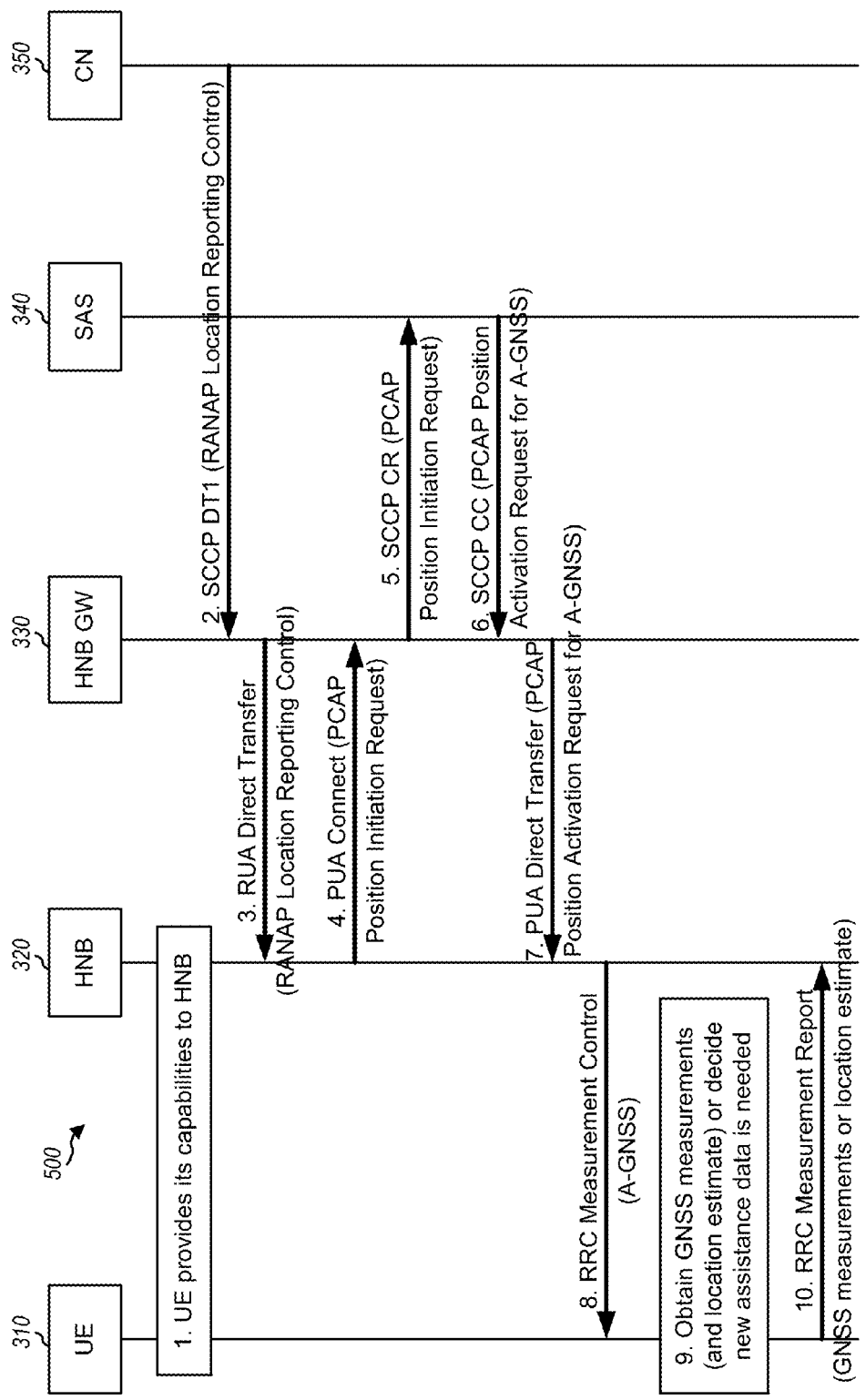
FIG. 5 shows a message flow for supporting A-GNSS for a UE.
Figure 5:
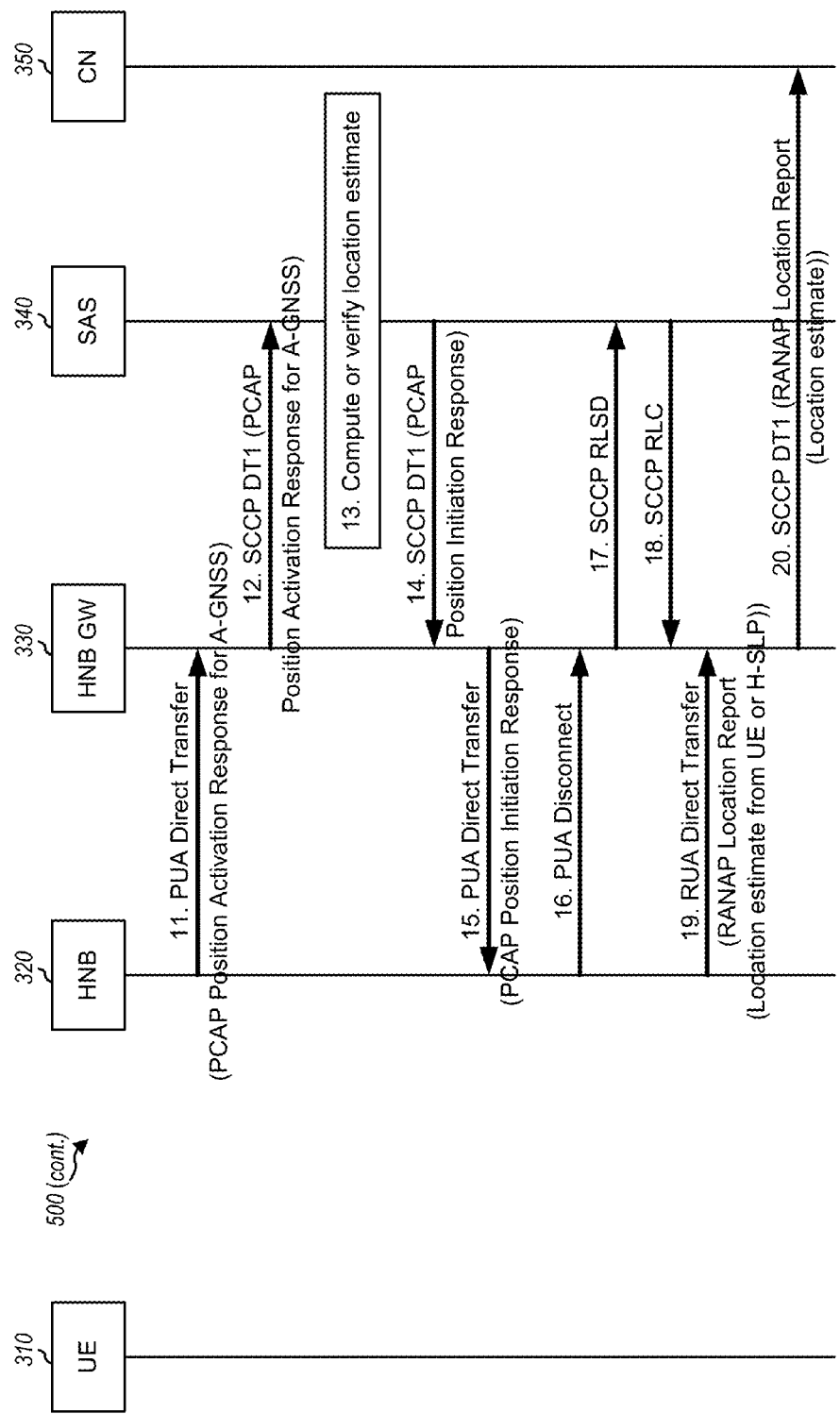

FIG. 5 shows a design of a message flow 500 for supporting location services and A-GNSS for UE 310 using SAS 340. UE 310 may associate with HNB 320 (e.g., establish a signaling connection with HNB 320 possibly after being paged by network 300 for the purpose of obtaining its location) and may provide its positioning capabilities to HNB 320 (step 1). LCS client 360 may desire to obtain the location of UE 310 and may send a request to GMLC 354 in core network 350. Core network 350 may then send a RANAP Location Reporting Control message in a SCCP DT1 message to request information on the location of UE 310 (step 2). HNB GW 330 may receive the SCCP DT1 message from core network 350 and may forward the RANAP Location Reporting Control message in a RUA Direct Transfer message to HNB 320 (step 3).

HNB 320 may receive the RUA Direct Transfer message, extract the RANAP Location Reporting Control message, and determine that information on the location of UE 310 is requested. HNB 320 may then send a PCAP Position Initiation Request message in a PUA Connect message to HNB GW 330 to initiate a location session with SAS 340 (step 4). The PUA Connect message may also include the identity of a SAS (e.g., SAS 340). The PCAP Position Initiation Request message may include a cell-id (e.g., a cell ID for HNB 320 or for a nearby macro cell visible to HNB 320), the UE positioning capabilities (e.g., A-GNSS), etc. HNB GW 330 may receive the PUA Connect message from HNB 320 and may forward the PCAP Position Initiation Request message in a SCCP Connection Request (CR) message to SAS 340 (step 5). HNB GW 330 may determine SAS 340 from the identity of any SAS included in the PUA Connect message or in other ways (e.g., by default if only one SAS is connected to HNB GW 330).

SAS 340 may receive the PCAP Position Initiation Request message and may initiate an A-GNSS positioning procedure by sending a PCAP Position Activation Request message in a SCCP Connection Confirm (CC) message (step 6). The PCAP Position Activation Request message may include a request for A-GNSS positioning, assistance data for A-GNSS, etc. HNB GW 330 may receive the SCCP CC message from SAS 340 and may forward the PCAP Position Activation Request message in a PUA Direct Transfer message to HNB 120 (step 7).

HNB 320 may obtain the information from the PCAP Position Activation Request message and may send the A-GNSS positioning request and assistance data in an RRC Measurement Control message to UE 310 (step 8). UE 310 may obtain GNSS measurements based on the assistance data (step 9). UE 310 may or may not be able to determine a location estimate based on the GNSS measurements. UE 310 may send to HNB 320 an RRC Measurement Report message that may include the GNSS measurements or location estimate obtained by UE 310 (step 10). HNB 320 may then forward the GNSS measurements or location estimate in a PCAP Position Activation Response message, which may be carried in a PUA Direct Transfer message sent to HNB GW 330 (step 11). HNB GW 330 may receive the PUA Direct Transfer message from HNB 320 and may forward the PCAP Position Activation Response message in a SCCP DT1 message to SAS 340 (step 12).

SAS 340 may receive the GNSS measurements or location estimate from the PCAP Position Activation Response message. SAS 340 may compute a location estimate for UE 310 based on the GNSS measurements and/or may verify the location estimate for UE 310. SAS 340 may then send the location estimate computed and/or verified by SAS 340 in a PCAP Position Initiation Response message, which may be carried in a SCCP DT1 message sent to HNB 330 (step 14). HNB GW 330 may receive the SCCP DT1 message from SAS 340 and may forward the PCAP Position Initiation Response message in a PUA Direct Transfer message to HNB 320 (step 15).

HNB 320 may receive the location estimate for UE 310 from either UE 310 in step 10 or SAS 340 in step 15. HNB 320 may terminate the location session with SAS 340 by sending a PUA Disconnect message to HNB GW 330 (step 16), and HNB GW 330 may send a SCCP Released (RLSD) message to SAS 340 (step 17). SAS 340 may return a SCCP Release Complete (RLC) message (step 18).

HNB 320 may send the location estimate for UE 310 in a RANAP Location Report message, which may be carried in a RUA Direct Transfer message sent to HNB GW 330 (step 19). HNB GW 330 may forward the RANAP Location Report message in a SCCP DT1 message to core network 350 (step 20).

In FIG. 5, SAS 340 may send assistance data for A-GNSS to UE 310 in steps 6 to 8. UE 310 may determine that it needs new assistance data in step 9. In this case, UE 310 may send a request for assistance data via HNB 320 to SAS 340. Steps 6 to 12 may then be performed to provide new assistance data to UE 310. Similarly, SAS 340 may determine in step 13 that it needs more location-related measurements or another location estimate. SAS 340 may then perform steps 6 to 12 again to (i) send more assistance data and another request for location measurements or a location estimate to UE 310 via HNB 320 and (ii) receive back from UE 310 via HNB 320 the location-related measurements or location estimate. If SAS 340 is able to recognize the request in step 5 as coming from HNB 320 (e.g., due to inclusion of an IMSI or IMEI for HNB 320 in the PCAP Position Initiation Request in step 4) and SAS 340 already has an accurate location for HNB 320, then SAS 340 may skip steps 6 to 13 and return the location of HNB 320 to HNB 320 in steps 14 and 15. The HNB location may be a good approximation for the location of UE 310, given that UE 310 is typically close to HNB 320 due to the small coverage area of any HNB. Alternatively, SAS 340 may return the location of HNB 320 to HNB 320 as an approximation for the location of UE 310 in steps 14 and 15 after performing steps 6 to 13 if SAS 340 is unable to obtain the location of UE 310 accurately enough from any measurements or a location estimate provided to SAS 340 in steps 11 and 12. This may be useful when UE 310 is unable to obtain accurate location measurements (e.g., if UE 310 is inside a building).

The designs in FIGS. 4 and 5 can support location services and A-GNSS for UE 310, as described above. These designs can also support other UE-assisted and UE-based positioning methods such as OTDOA and E-CID, etc. These designs can also support A-GNSS, E-CID, and other network-assisted positioning methods to obtain the location of HNB 320. These designs may be used for a SAS-centric mode (shown in FIG. 5) or an RNC-centric mode. In the RNC-centric mode, HNB 320 controls the location procedure rather than SAS 340, the RRC messages in FIG. 5 (steps 8 and 10) may remain the same, but different PCAP messages may be exchanged between HNB 320 and SAS 340 in place of those in FIG. 5 (steps 4, 5, 6, 7, 12 and 14).

In the designs shown in FIGS. 4 and 5, HNB 320 may inter-work PCAP messages and RRC messages. HNB 320 may receive a PCAP message from SAS 340 and may forward pertinent information in an RRC positioning message to UE 110. HNB 320 may also receive an RRC positioning message from UE 110 and may forward pertinent information in a PCAP message to SAS 340.

In the designs shown in FIGS. 4 and 5, HNB GW 330 may support transfer of PCAP messages between HNB 320 and SAS 340, e.g., using PUA as shown in FIGS. 4 and 5. HNB GW 330 may receive PCAP messages sent in SCCP messages by SAS 340 and may forward these PCAP messages in PUA messages (as shown in FIG. 5) and/or RUA messages to HNB 320. HNB GW 330 may also receive PCAP messages sent in PUA messages by HNB 320 (as shown in FIG. 5) and may forward these PCAP messages in SCCP messages to SAS 340.

In one design, RUA may be extended to transfer PCAP messages. In another design, PUA may be defined to transfer PCAP messages between HNB 320 and HNB GW 330 (e.g., as shown in FIG. 5). This design may avoid impacting RANAP support and may thus simply implementation. PUA may have certain properties that may be different from RUA. For example, PUA may have one or more of the following characteristics:

Carry PCAP messages instead of RANAP messages,
Include no reference to a particular UE,
Support transaction IDs for connectionless PCAP messages, and
Support multiple SASs.

In one design, PUA messages may not be explicitly associated with a particular UE since an HNB GW does not need to be aware of the UE association. In addition, an HNB may use PUA messages to transfer PCAP messages to a SAS in order to locate the HNB. In that case, there is no UE to locate and hence PUA message association with a UE would not be possible.

In one design, connectionless and possibly connection-oriented PCAP messages sent by HNB 320 may contain unique PCAP transaction IDs. A PCAP transaction ID may be used at the PCAP level to associate a PCAP response message with a PCAP request message when these PCAP messages are transferred using connectionless SCCP and possibly connection-oriented SCCP between HNB GW 330 and SAS 340. The PCAP transaction IDs may be managed and assigned by HNB GW 330 and provided to HNB 320 using PUA when HNB 320 sends a PUA request to HNB GW 330 for a unique transaction ID for a particular SAS. SAS 340 may see HNB GW 330 as an RNC and may not be aware of the various HNBs such as HNB 320 behind HNB GW 330. SAS 340 may thus support a single set of transaction IDs with HNB GW 330. Different HNBs, such as HNB 320 and HNB 322, should not use the same PCAP transaction ID since this may cause errors. For example, a connectionless PCAP response message from SAS 340 intended for HNB 320 may be misrouted by HNB GW 330 to HNB 322. HNB 320 may obtain a unique PCAP transaction ID from HNB GW 330 and, some time later, may send a PUA message to HNB GW 330 to release the transaction ID, thereby allowing HNB GW 330 to assign the PCAP transaction ID to another HNB (e.g., HNB 322) at a later time. By sending a unique PCAP transaction ID to HNB 320 for connectionless PCAP messages, HNB GW 330 does not need to inspect connectionless PCAP messages transferred through HNB GW 330 from HNB 320 to SAS 340 in order to verify that the PCAP transaction ID is unique. This may avoid having to support part of the PCAP protocol at HNB GW 330. However, HNB GW 330 may inspect any connectionless PCAP response message sent by SAS 340 to HNB 320 to obtain the PCAP transaction ID in order to route the PCAP message to HNB 320 and not to some other HNB such as HNB 322.

For connection-oriented PCAP messages, a SCCP connection may be established between HNB GW 330 and SAS 340 to transfer these messages. The SCCP connection may be used (i) to help associate a PCAP response message sent from SAS 340 to HNB 320 with an earlier PCAP request message sent from HNB 320 to SAS 340 and (ii) to route the PCAP response message to the correct HNB. Hence, HNB GW 330 may not need to inspect connection-oriented PCAP messages sent by SAS 340 in order to route such messages to the correct HNB. However, the mechanism for HNB 320 to request unique PCAP transaction IDs from HNB GW 330 may still be employed unless SAS 340 allows transaction IDs for connection-oriented PCAP messages to be unique only with respect to each SCCP connection. In this latter case, HNB 320 can assign the PCAP transaction ID itself without assistance from HNB GW 330.

In an alternative design, HNB GW 330 may translate between PCAP transaction IDs assigned by HNB 320 and PCAP transaction IDs seen by SAS 340. In this design, HNB 320 may manage its own PCAP transaction IDs and insert a suitable transaction ID X into any PCAP request message sent to SAS 340 via HNB GW 330. HNB GW 330 may then replace the transaction ID X with another transaction ID Y that is unique to the interface between HNB GW 330 and SAS 340 and may then forward the PCAP request message to SAS 340. SAS 340 may later send back a PCAP response message for this PCAP request carrying the same transaction ID Y. HNB GW may then inspect the PCAP response, replace the transaction ID Y by the transaction ID X, and route the PCAP response message back to HNB 320. With this alternative design, HNB GW 330 may support more of the PCAP protocol but the extent of PUA support by HNB 320 and HNB GW 330 may be reduced (e.g., HNB 320 may no longer request PCAP transaction IDs from HNB GW 330).

For PCAP transactions initiated by SAS 340 towards HNB 320, PCAP transaction IDs may be transferred between SAS 340 and HNB 320 without interpretation or alteration by HNB GW 330 since SAS 340 can ensure that for each type of PCAP procedure the transaction IDs are unique.

In one design, PUA may perform one or more of the following functions:

Control or report setup and release of SCCP connections over the Iupc interface for transfer of connection-oriented PCAP messages,
Transfer connection-oriented PCAP messages,
Use a local identifier in PUA messages to identify SCCP connections associated with a particular HNB on the Iupc interface,
Transfer connectionless PCAP messages and manage PCAP transaction ID allocation, and
Identify a SAS in case multiple SASs connect to an HNB GW (e.g., allow an HNB to select a particular SAS for a new PCAP procedure).

In one design, a set of PUA messages may be supported and may include one or more of the following PUA messages:

PUA Connect message—used to setup or report setup of a SCCP connection between an HNB GW and a SAS for transfer of connection-oriented PCAP messages to or from an HNB, Direct Transfer message—used to transfer a connection-oriented PCAP message between an HNB GW and an HNB, Disconnect message—used to release or report release of a SCCP connection between an HNB GW and a SAS, Request Transaction ID message—sent by an HNB to an HNB GW to obtain a unique PCAP transaction ID for connectionless PCAP messages, Return Transaction ID message—sent by an HNB to an HNB GW to return a PCAP transaction ID to a common pool of PCAP transaction IDs maintained by the HNB GW, Connectionless Transfer message—used to transfer a connectionless PCAP message between an HNB and an HNB GW, and HNB Transfer message—used to support continued UE location following an intra-HNB GW handover that starts after a UE location procedure was started by the source HNB for the handover.

Each PUA message may include any number of parameters in any suitable format. In one design, a PUA Connect message may include a PCAP message, a local PUA reference to a SCCP connection between the HNB GW and a SAS, a SAS ID if there are multiple SASs, etc. An HNB GW may manage the association between local PUA connection references used between the HNB GW and an HNB and SCCP connections between the HNB GW and a SAS. A PUA Direct Transfer message may include a connection-oriented PCAP message and a local PUA connection reference. A PUA Connectionless Transfer message may include a connectionless PCAP message and a SAS ID if there are multiple SASs.

In another design, the various capabilities, messages and parameters disclosed above for PUA may be included in RUA in order to support location of UE 310 or HNB 320 using PCAP between HNB 320 and SAS 340. In this design, PCAP messages would be transferred between HNB 320 and HNB GW 330 using RUA instead of PUA.

UE 310 may perform a location procedure with HNB 320, e.g., as shown in FIG. 5. UE 310 may be mobile and may be handed over from source HNB 320 to target HNB 322 during the location procedure. HNBs 320 and 322 may both be connected to the same HNB GW 330, and an intra-HNB GW handover may be performed for UE 310. In one design, source HNB 320 may terminate the location procedure for UE 310 by (i) sending a PCAP Abort message to SAS 340 for any ongoing SAS-centric location session and (ii) sending a RANAP Location Report message with an error cause to MSC/SGSN 352. A new location procedure may then be initiated after UE 310 is handed over to target HNB 322.

In another design, the ongoing location procedure for UE 310 via source HNB 320 may be continued via target HNB 322. In one design, HNB GW 330 may indicate to source HNB 320 whether handover of UE 310 is intra-HNB GW. Source HNB 320 may then decide whether to abort the location procedure or continue the location procedure via target HNB 322. In one design, if continuation of the location procedure is decided, then source HNB 320 may transfer location status information for UE 310 to target HNB 322 via HNB GW 330. Any SAS-centric location session may continue via target HNB 322, which may update SAS 340 with a new cell ID for HNB 322. If handover of UE 310 fails for any reason, then source HNB 320 may continue the location procedure for UE 310.

Figure 6:
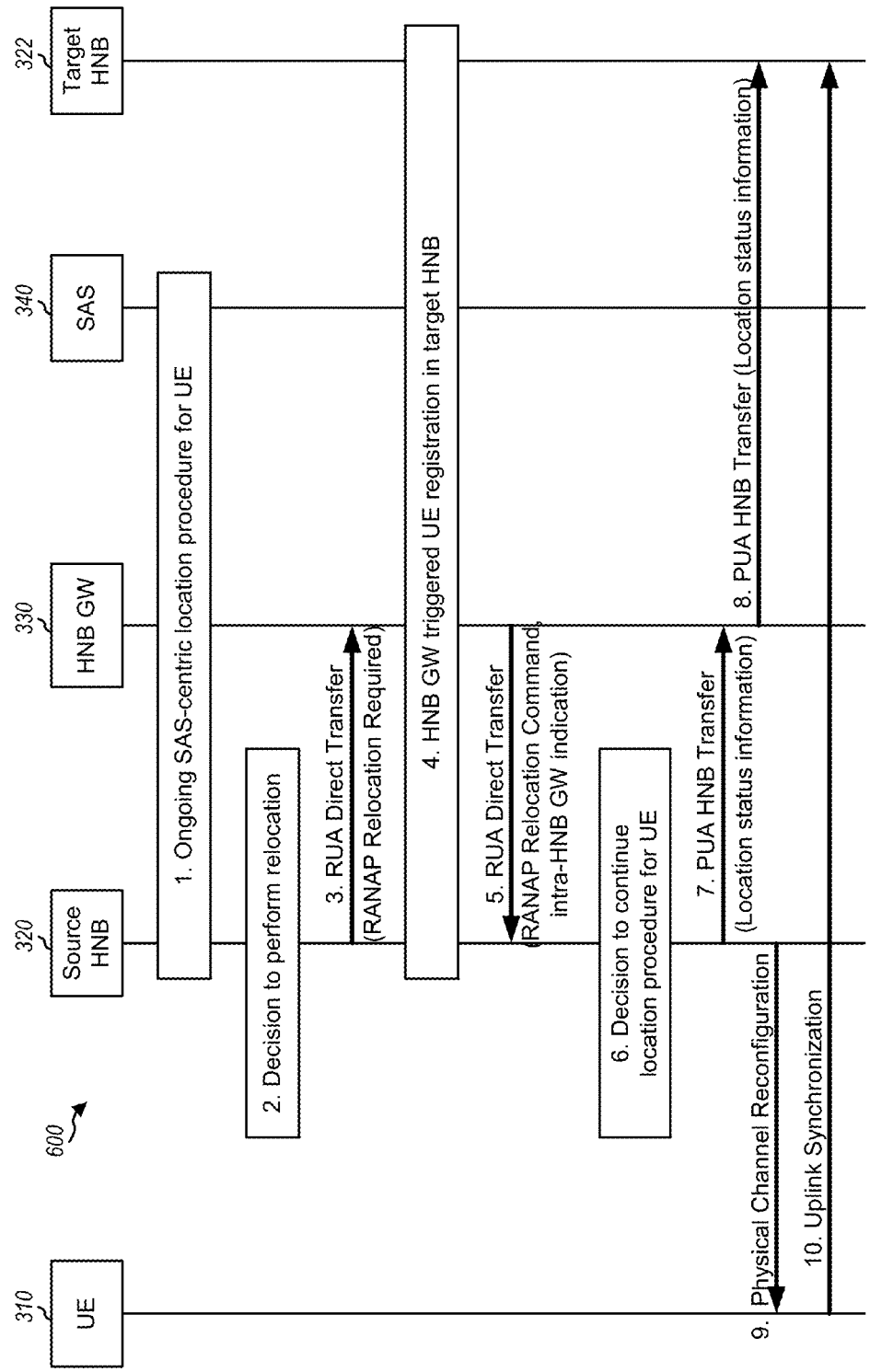
FIG. 6 shows a message flow for continuing a location procedure for a UE during intra-HNB GW handover.
Figure 6:
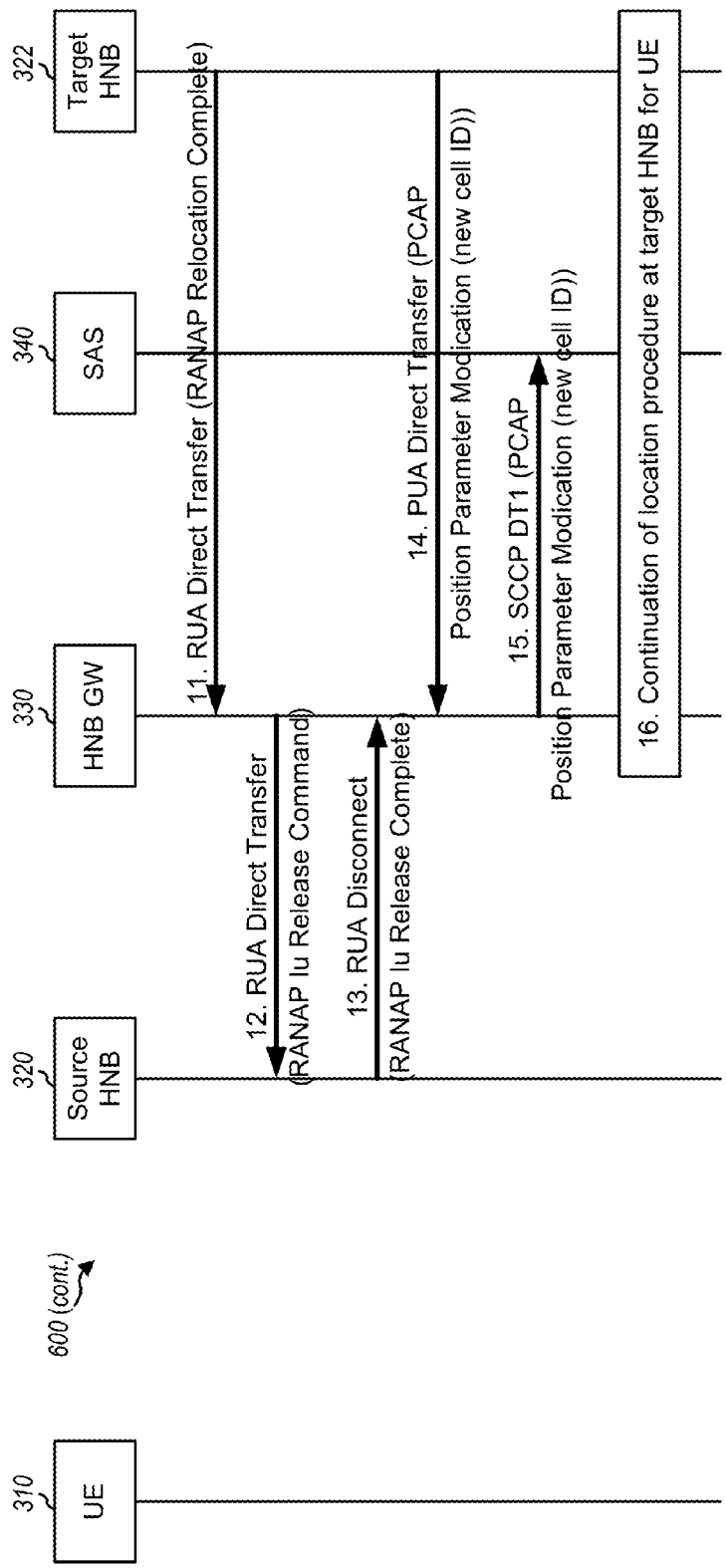

FIG. 6 shows a design of a message flow 600 for continuing a location procedure for UE 310 for intra-HNB GW handover. UE 310 may initially communicate with HNB 320, which may have an ongoing location procedure with SAS 340 for UE 310 (step 1). HNB 320 may decide to perform relocation for handover of UE 310 to HNB 322 (step 2). HNB 320 may then send a RANAP Relocation Required message in a RUA Direct Transfer message to HNB GW 330 (step 3). HNB GW 330 may trigger registration of UE 310 in target HNB 322 (step 4). HNB GW 330 may return a RANAP Relocation Command message, which may include an indication of intra-HNB GW handover, in a RUA Direct Transfer message to HNB 320 (step 5).

HNB 320 may decide to continue the location procedure for UE 310 (step 6). HNB 320 may then send a PUA HNB Transfer message containing location status information for the location procedure to HNB GW 330 (step 7). HNB GW 330 may forward the PUA HNB Transfer message to HNB 322 (step 8).

At any time after a decision to perform relocation in step 5, HNB 320 may send a Physical Channel Reconfiguration message to UE 310 (step 9). This message may indicate handover of UE 310 to HNB 322. UE 310 may then perform uplink synchronization to HNB 322 (step 10).

After receiving the uplink synchronization in step 10, HNB 322 may send a RANAP Relocation Complete message in a RUA Direct Transfer message to HNB GW 330 (step 11). HNB GW 330 may then send a RANAP Iu Release Command message in a RUA Direct Transfer message to HNB 320 (step 12). HNB 320 may return a RANAP Iu Release Complete message in a RUA Disconnect message to HNB GW 330 (step 13).

To continue the location procedure for UE 310, HNB 322 may send a PCAP Position Parameter Modification message, which may include a new cell ID for HNB 322, in a PUA Direct Transfer message to HNB GW 330 (step 14). HNB GW 330 may forward the PCAP Position Parameter Modification message in a SCCP DT1 message to SAS 340 using the same SCCP connection that was previously assigned to HNB 320 for the initial UE location. The location procedure may then continue between HNB 322 and SAS 340 via HNB GW 330 (step 16). HNB GW 330 may continue to use any state information previously associated with HNB 320 for the Iupc interface with SAS 340 (such as SCCP connection information) for support of the location procedure transferred to HNB 322.

In general, the location status information forwarded by source HNB 320 to target HNB 322 may include any information that may be useful or necessary to continue the location procedure for UE 310. In one design, the location status information may include information provided earlier to HNB 320 in the original location request from core network 350 such as the requested QoS, requested priority, request for velocity, overall duration of the location procedure so far in HNB 320, details applicable to any periodic request (e.g., number of periodic location reports completed so far), etc. In one design, the location status information may include a PCAP transaction ID used by HNB 320 and a local connection reference used between HNB 320 and HNB GW 330 for the PCAP Position Initiation Request message, if the SAS-centric mode was used.

In one design, the location status information may include, for each ongoing SAS-centric positioning method activated by SAS 340 at HNB 320 for UE 310, one or more of the following:

Positioning method type (e.g., UE-assisted A-GNSS or OTDOA),
PCAP transaction ID used by SAS 340 in the PCAP Position Activation Request message,
Required response time and current duration of the positioning method, and
Information (e.g., measurements from UE 310) obtained so far for the positioning method (e.g., for OTDOA).

A location session for OTDOA may be aborted if source HNB 320 is the reference cell for OTDOA measurements since UE 310 may not be able to obtain OTDOA measurements for HNB 320 after the handover. Hence, it may be simpler to always abort OTDOA on the target side from HNB 322 and not transfer detailed information from source HNB 320. Information for U-TDOA need not be included in the location status information (e.g., for a CELL_FACH state if applicable) since the location procedure may be terminated in SAS 340 upon receipt of a new cell ID from target HNB 322.

In one design, an assumption may be made that source HNB 320 has sent an RRC Measurement Control message to UE 310 for any ongoing UE-assisted or UE-based positioning method such as A-GNSS or OTDOA. In this case, target HNB 322 would not need to send an RRC Measurement Control message to UE 310. If source HNB 320 has not sent an RRC Measurement Control message, then source HNB 320 or target HNB 322 may send a PCAP Position Activation Failure message to SAS 340.

FIG. 5 shows a design of supporting location services and A-GNSS and/or other positioning methods for UE 310. A-GNSS and/or other positioning methods for HNB 320 may be supported in similar manner to enable the location of HNB 320 to be determined. HNB 320 may continue to use PCAP and PUA as described above. However, instead of interacting with UE 310 to provide assistance data for A-GNSS and obtain GNSS measurements or a location estimate, HNB 320 may take on the role of a UE and may make GNSS and/or other (e.g., OTDOA) measurements and/or obtain a location estimate, possibly with the help of assistance data received from SAS 340. In this case, HNB 320 would not need to inter-work PCAP and RRC but may instead use PCAP as a positioning protocol. From the perspective of HNB GW 330 and SAS 340, positioning of HNB 320 may appear the same or nearly the same as positioning of UE 310, thereby requiring little or no additional support.

Figure 7:
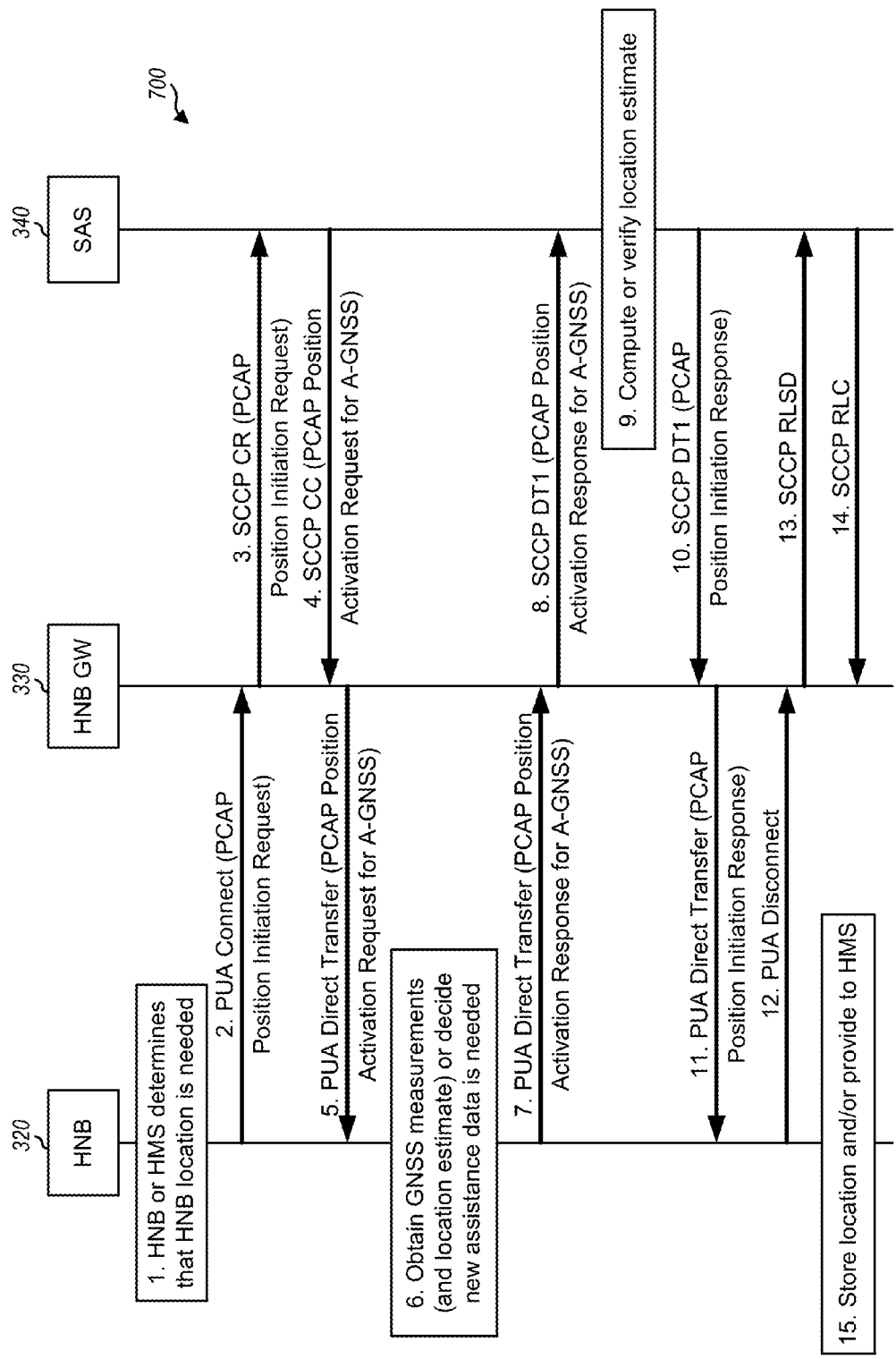
FIG. 7 shows a message flow for supporting A-GNSS for an HNB.

FIG. 7 shows a design of a message flow 700 for supporting location services and A-GNSS for HNB 320 using SAS 340. HNB 320 or HMS 324 may determine that the location of HNB 320 is needed (step 1). HNB 320 may send a PCAP Position Initiation Request message in a PUA Connect message to HNB GW 330 to initiate a location session with SAS 340 (step 2). The PUA Connect message may also contain the identity of a SAS (e.g., SAS 340). The PCAP Position Initiation Request message may include a cell-id (e.g., the cell ID of a nearby macro cell visible at HNB 320), positioning capabilities of HNB 320 (e.g., A-GNSS), etc. HNB GW 330 may forward the PCAP Position Initiation Request message in a SCCP CR message to SAS 340 (step 3). HNB GW 330 may determine SAS 340 from the identity of any SAS included in the PUA Connect message or in other ways (e.g., by default if only one SAS is connected to HNB GW 330). SAS 340 may receive the PCAP Position Initiation Request message and may initiate an A-GNSS positioning procedure by sending a PCAP Position Activation Request message, which may include assistance data for A-GNSS, in a SCCP CC message sent to HNB GW 330 (step 4). HNB GW 330 may forward the PCAP Position Activation Request message in a PUA Direct Transfer message to HNB 320 (step 5).

HNB 320 may receive the PCAP Position Activation Request message and may obtain GNSS measurements, e.g., based on the assistance data received from SAS 340 (step 6). HNB 320 may or may not be able to determine a location estimate based on the GNSS measurements and assistance data received in step 5. HNB 320 may send a PCAP Position Activation Response message, which may include the GNSS measurements and/or location estimate, in a PUA Direct Transfer message sent to HNB GW 330 (step 7). HNB GW 330 may forward the PCAP Position Activation Response message in a SCCP DT1 message to SAS 340 (step 8).

SAS 340 may receive the GNSS measurements and/or location estimate from the PCAP Position Activation Response message. SAS 340 may compute a location estimate for HNB 320 based on the GNSS measurements (if provided) and/or may verify the location estimate for HNB 320 (step 9). SAS 340 may then send the location estimate computed and/or verified by SAS 340 in a PCAP Position Initiation Response message, which may be carried in a SCCP DT1 message sent to HNB 330 (step 10). HNB GW 330 may forward the PCAP Position Initiation Response message in a PUA Direct Transfer message to HNB 320 (step 11).

HNB 320 may terminate the location session with SAS 340 by sending a PUA Disconnect message to HNB GW 330 (step 12), which may send a SCCP Released message to SAS 340 (step 13). SAS 340 may return a SCCP Release Complete (RLC) message (step 14). HNB 320 may store its location estimate and/or provide the location estimate to HMS 324.

In FIG. 7, SAS 340 may send assistance data for A-GNSS to HNB 320 in steps 4 and 5. HNB 320 may determine that it needs new assistance data in step 6. In this case, HNB 320 may send a request for assistance data to SAS 340. Steps 4 to 8 may then be performed to provide new assistance data to HNB 320. Similarly in FIG. 7, SAS 340 may determine that it needs more measurements or another location estimate in step 9 and may repeat steps 4 to 8 in order to obtain the measurements or a location estimate from HNB 320.

While FIG. 7 shows use of A-GNSS, SAS 340 may invoke one or more additional or alternative positioning methods in steps 4 to 8. For example, SAS 340 may invoke OTDOA and may include assistance data for OTDOA in the PCAP Position Activation message sent in steps 4 and 5. HNB 320 may then obtain OTDOA measurements or a location estimate based on OTDOA measurements in step 6 and may return the OTDOA measurements or location estimate to SAS 340 in a PCAP Position Activation Response message in steps 7 and 8. HNB 320 may also include an identification for itself (e.g., an IMSI or IMEI) in the PCAP Position Initiation Request message sent to SAS 340 in steps 2 and 3. This identification may be recognized by SAS 340 as belonging to either some HNB, or to HNB 320 in particular, due to pre-configuration of the identity of HNB 320 (e.g., a range of identities for a set of HNBs) by the operator of network 300 in SAS 340. SAS 340 may use this known identity to invoke positioning methods and provide assistance data to HNB 320 in steps 4 and 5 that are more suitable for locating an HNB (e.g., HNB 320) than for locating a UE (e.g., UE 310). SAS 340 may also retrieve other information previously obtained and stored for HNB 320 (e.g., a previous location estimate for HNB 320) or configured for HNB 320 (e.g., positioning capabilities) to assist the new location session.

In one design, message flow 700 may be supported with some changes to PCAP and some associated changes to positioning in HNB 320 and SAS 340. An HNB indication and/or some other HNB identity (e.g., not an IMSI or IMEI) may be included in PCAP messages. SAS 340 may use known HNB characteristics and/or previously obtained HNB information (e.g., provided by HNB 320 after it registers with HNB GW 330) to improve location support. SAS 340 may also update its information for HNB 320 with any new location obtained for HNB 320. A cell ID IE in the PCAP Position Initiation Request message may be for a neighbor macro cell if there is good signal strength. Alternatively, an approximate location estimate of HNB 320 may be provided in a PCAP message (e.g., a PCAP Position Initiation Request message in steps 2 and 3) if there is no such macro cell. For OTDOA, a macro reference cell may be preferred for OTDOA measurements (e.g., any macro cell provided by HNB 320). For E-CID, only measurements defined for a UE may be provided to SAS 340, although these measurements may be provided by HNB 320 to SAS 340 as if HNB 320 were a UE. For A-GNSS, any fine time assistance (FTA) from SAS 340 may be provided relative to a nearby macro cell visible to HNB 320.

In another design, message flow 700 may be supported by having HNB 320 emulate location of a UE that is served by and co-located at HNB 320 (e.g., with a round trip time (RTT) of zero) in order to avoid impact to PCAP and SAS 340.

In one design, HNB 320 may request information (e.g., assistance data) for A-GNSS, OTDOA, and/or other positioning methods from SAS 340 in order to assist location for UEs served by or located close to HNB 320. The request and the requested information may be sent in PCAP messages, which may be forwarded by HNB GW 330 using PUA and SCCP. For example, the request may be sent in a PCAP Information Exchange Initiation Request message. The requested information may be sent in a PCAP Information Exchange Initiation Response message or periodically in PCAP Information Report messages. HNB 320 may broadcast the information received from SAS 340 to UEs (e.g., UE 310) for their use for positioning. A decision on whether to support broadcast can be made, e.g., when HNB 320 registers with HMS 324.

Figures 8, 9:
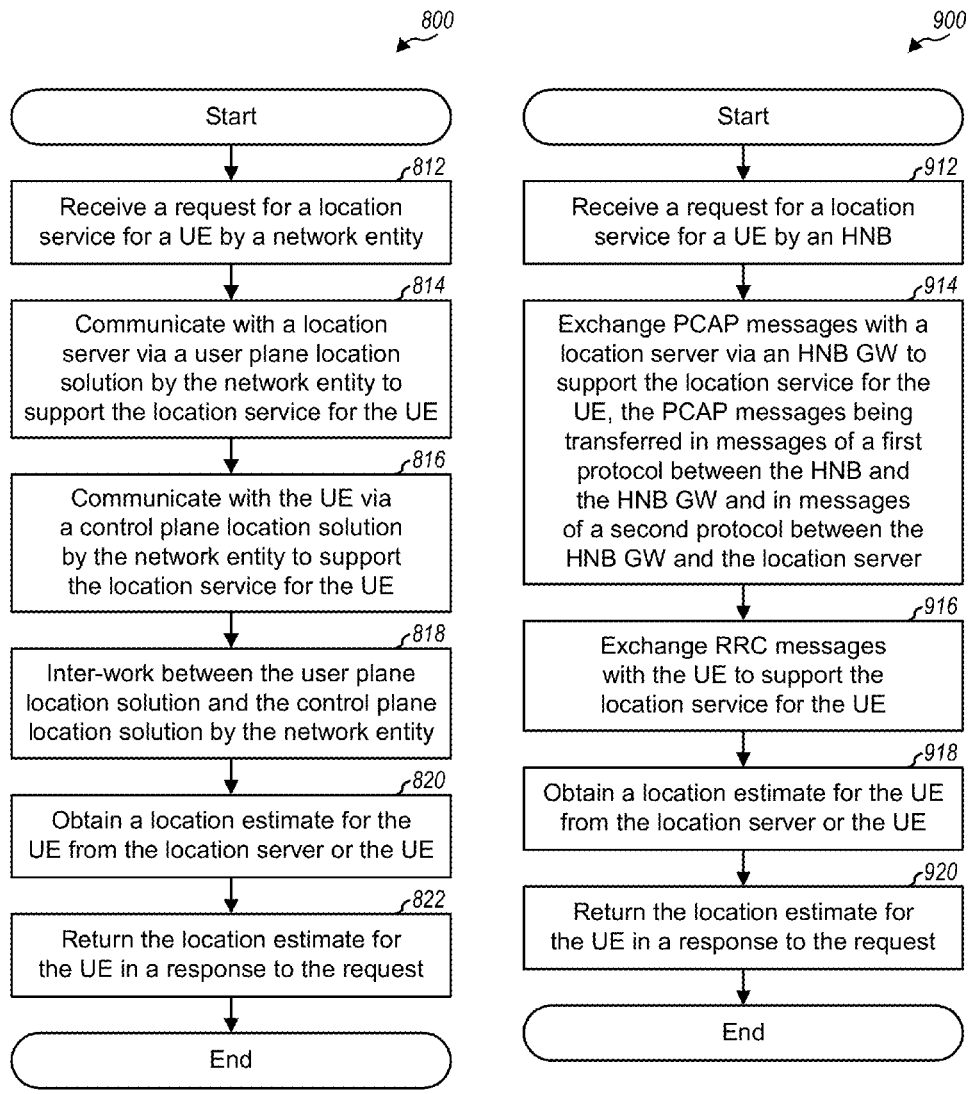
FIGS. 8, 9 and 10 show three processes for supporting location services for UEs.

FIG. 8 shows a design of a process 800 for supporting location services for UEs. Process 800 may be performed by a network entity, which may be an HNB, a MSC, a SGSN, a RNC, a MME, a BSC, etc. For example, the network entity may be HNB 120 in message flow 200 in FIG. 2.

The network entity may receive a request for a location service for a UE (block 812). The network entity may communicate with a location server (e.g., an H-SLP) via a user plane location solution (e.g., SUPL) to support the location service for the UE (block 814). The network entity may communicate with the UE via a control plane location solution (e.g., 3GPP control plane location solution) to support the location service for the UE (block 816). The network entity may inter-work between the user plane location solution and the control plane location solution (block 818).

The location service may include positioning to determine the location of the UE (e.g., with A-GNSS or some other network-assisted positioning method), delivery of assistance data to the UE, etc. The network entity may obtain a location estimate for the UE from the location server or the UE (block 820). The network entity may return the location estimate for the UE in a response to the request (block 822).

In one design, the network entity may receive a first message for the user plane location solution from the location server and may send a second message for the control plane location solution to the UE. The network entity may transfer at least part of the information in the first message to the second message. The network entity may receive a third message for the control plane location solution from the UE and may send a fourth message for the user plane location solution to the location server. The network entity may transfer at least part of the information in the third message to the fourth message. In one design, the first and fourth messages may be for RRLP positioning protocol, and the second and third messages may be for RRC positioning protocol.

In one design, the network entity may act as the UE for communication with the location server and may provide capabilities of the UE to the location server. The location server may provide assistance (e.g., delivery of assistance data, computation or verification of a location estimate, etc.) based on the positioning capabilities of the UE.

FIG. 9 shows a design of a process 900 for supporting location services for UEs. Process 900 may be performed by an HNB (as described below) or by some other entity. For example, the HNB may be HNB 320 in message flow 500 in FIG. 5.

The HNB may receive a request for a location service for a UE (block 912). The HNB may exchange PCAP messages with a location server (e.g., a SAS) via an HNB GW to support the location service for the UE (block 914). The PCAP messages may be transferred (i) in messages of a first protocol (e.g., PUA or RUA) between the HNB and the HNB GW and (ii) in messages of a second protocol (e.g., SCCP) between the HNB GW and the location server. The HNB may exchange RRC messages with the UE to support the location service for the UE (block 916).

The location service may include positioning to determine the location of the UE (e.g., with A-GNSS or some other network-assisted positioning method), delivery of assistance data to the UE, etc. The HNB may obtain a location estimate for the UE from the location server or the UE (block 918). The HNB may return the location estimate for the UE in a response to the request (block 920).

In one design, the HNB may receive a first PCAP message from the location server and may send a first RRC message to the UE. The first RRC message may include a positioning request and/or assistance data, which may be obtained from the first PCAP message. In one design, the HNB may receive a second RRC message from the UE and may send a second PCAP message to the location server. The PCAP message may include measurements made by the UE and/or a location estimate for the UE, which may be obtained from the RRC message.

In one design, the PCAP messages may be transferred in PUA messages between the HNB and the HNB GW. In one design, the PCAP messages may be transaction-oriented messages, and the PUA messages may be associated with connection-oriented or connectionless transfer via SCCP. A PUA message may include an identifier of the location server (e.g., SAS), a transaction identifier, a local connection reference, a PCAP message, or a combination thereof.

In one design, the HNB may send information for itself to the location server. The information may comprise a cell global identifier for the HNB, location of the HNB, at least one cell ID of at least one neighbor cell, positioning capabilities of the HNB, etc.

Figures 10, 11:
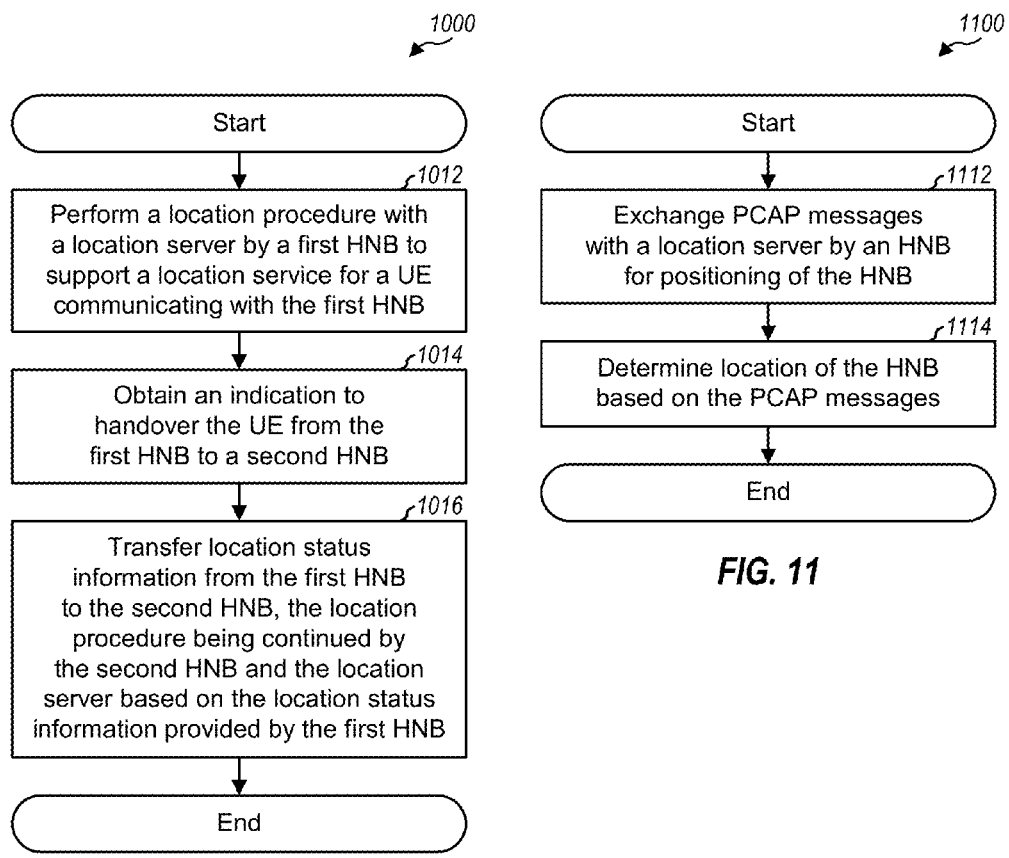
FIG. 11 shows a process for supporting location services for an HNB.

FIG. 10 shows a design of a process 1000 for supporting location services for UEs. Process 1000 may be performed by a first HNB (as described below) or by some other entity. For example, the first HNB may be source HNB 320 in message flow 600 in FIG. 6.

The first HNB may perform a location procedure with a location server to support a location service for a UE communicating with the first HNB (block 1012). The location service may include positioning to determine the location of the UE (e.g., with A-GNSS or some other network-assisted positioning method), delivery of assistance data to the UE, etc. The first HNB may obtain an indication to handover the UE from the first HNB to a second HNB (block 1014). The first HNB and the second HNB may both interface with the same HNB GW and may communicate with the location server via the HNB GW. The first HNB may transfer location status information to the second HNB (block 1016). The location status information may include at least one positioning method used in the location procedure, information obtained for each positioning method, information related to location reporting, and/or other information. The location procedure may be continued by the second HNB and the location server based on the location status information provided by the first HNB.

The first HNB may decide whether to abort the location procedure or to continue the location procedure after handover of the UE to the second HNB. The first HNB may transfer the location status information to the second HNB in response to a decision to continue the location procedure. The first HNB may determine that handover of the UE from the first HNB to the second HNB failed. The first HNB may then continue the location procedure with the location server upon determining handover failure for the UE.

FIG. 11 shows a design of a process 1100 for supporting location services for an HNB. Process 1100 may be performed by the HNB (as described below) or by some other entity. For example, the HNB may be HNB 320 in message flow 700 in FIG. 7. The HNB may exchange PCAP messages with a location server (e.g., via an HNB GW) for positioning of the HNB (block 1112). The PCAP messages may be transferred (i) in messages of a first protocol (e.g., PUA) between the HNB and the HNB GW and (ii) in messages of a second protocol (e.g., SCCP) between the HNB GW and the location server. The HNB may determine its location based on the PCAP messages (block 1114).

Figure 12:
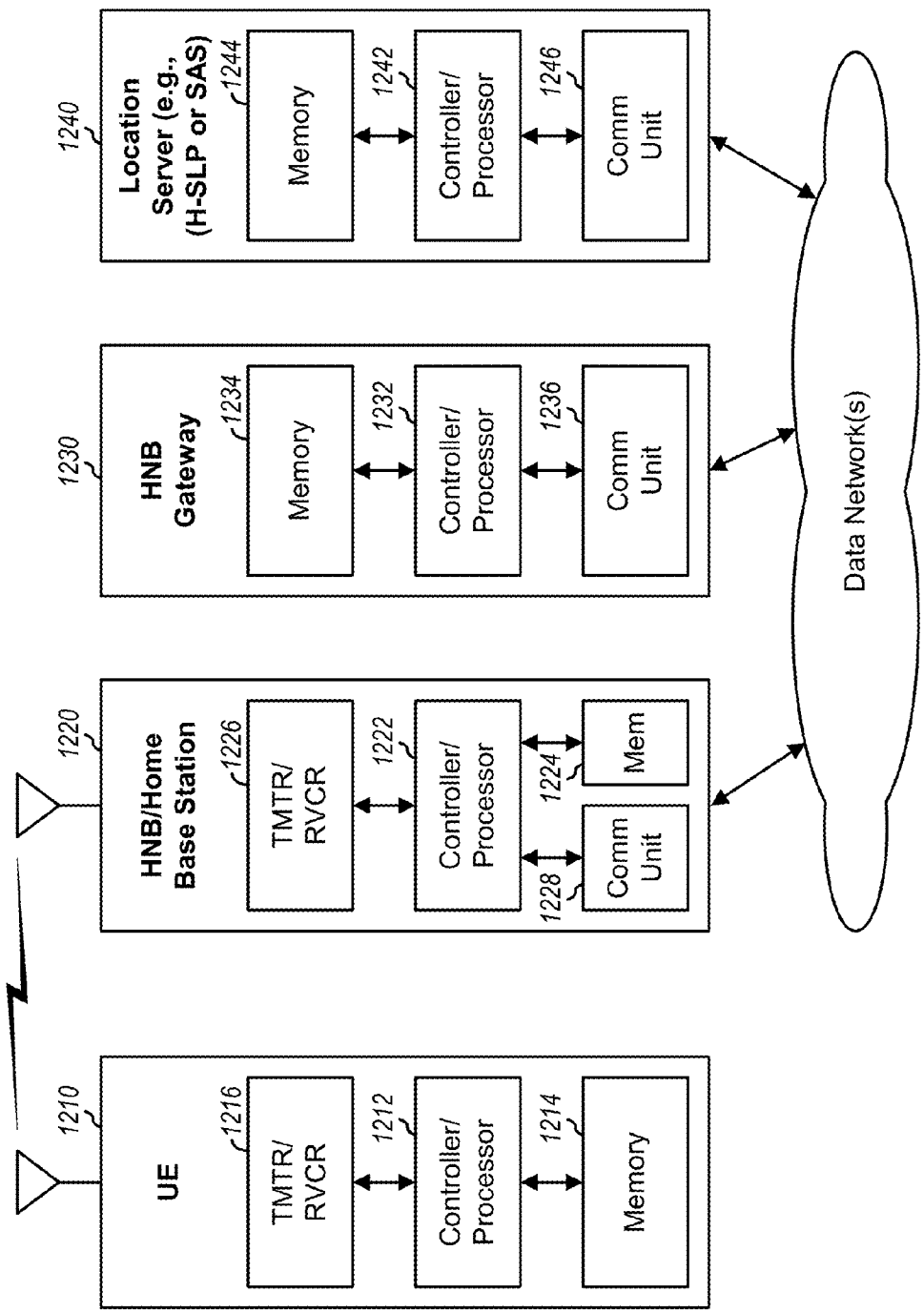
FIG. 12 shows a block diagram of a UE and various network entities.

FIG. 12 shows a block diagram of a design of a UE 1210, an HNB/home base station 1220, an HNB GW 1230, and a location server 1240. UE 1210 may be UE 110 in FIG. 1 or UE 310 in FIG. 3. HNB 1220 may be HNB 120 in FIG. 1 or HNB 320 in FIG. 3. HNB GW 1230 may be HNB GW 130 in FIG. 1 or HNB GW 330 in FIG. 3. Location server 1240 may be H-SLP 140 in FIG. 1 or SAS 340 in FIG. 3. For simplicity, FIG. 12 shows (i) one controller/processor 1212, one memory 1214, and one transmitter/receiver (TMTR/RCVR) 1216 for UE 1210, (ii) one controller/processor 1222, one memory (Mem) 1224, one transmitter/receiver 1226, and one communication (Comm) unit 1228 for HNB 1220, (iii) one controller/processor 1232, one memory 1234, and one communication unit 1236 for HNB GW 1230, and (iv) one controller/processor 1242, one memory 1244, and one communication unit 1246 for location server 1240. In general, each entity may include any number of controllers, processors, memories, transceivers, communication units, etc.

On the downlink, HNB 1220 may transmit traffic data, signaling, broadcast information, and pilot to UEs within its coverage. These various types of data may be processed by processor 1222, conditioned by transmitter 1226, and transmitted on the downlink. At UE 1210, the downlink signals from HNB 1220 and/or other base stations may be received via an antenna, conditioned by receiver 1216, and processed by processor 1212 to recover the various types of information sent by HNB 1220 and/or other base stations. Processor 1212 may perform processing for the UE in the message flows in FIGS. 2, 5 and 6. Memories 1214 and 1224 may store program codes and data for UE 1210 and HNB 1220, respectively. On the uplink, UE 1210 may transmit traffic data, signaling, and pilot to HNB 1220 and/or base stations. These various types of data may be processed by processor 1212, conditioned by transmitter 1216, and transmitted on the uplink. At HNB 1220, the uplink signals from UE 1210 and other UEs may be received and conditioned by receiver 1226 and further processed by processor 1222 to recover the various types of information sent by UE 1210 and other UEs. Processor 1222 may perform or direct process 800 in FIG. 8, process 900 in FIG. 9, process 1000 in FIG. 10, process 1100 in FIG. 11, and/or other processes for the techniques described herein. Processor 1222 may also perform processing for HNB 120 or 320 in the message flows in FIGS. 2, 5, 6 and 7. HNB 1220 may communicate with other network entities via communication unit 1228.

Within HNB GW 1230, processor 1232 may support communication for HNBs within its control, support transfer of messages between HNB 1220 and location server 1240, and perform other functions normally performed by an HNB GW. Processor 1232 may also perform processing for HNB GW 130 or 330 in the message flows in FIGS. 2, 5, 6 and 7. Memory 1234 may store program codes and data for HNB GW 1230. Communication unit 1236 may allow HNB GW 1230 to communicate with other entities.

Within location server 1240, processor 1242 may perform positioning for UEs, provide assistance data to UEs, support location services for UEs and other LCS clients, etc. Processor 1242 may also perform processing for H-SLP 140 in the message flow in FIG. 2 and for SAS 340 in the message flows in FIGS. 5, 6 and 7. Memory 1244 may store program codes and data for location server 1240. Communication unit 1246 may allow location server 1240 to communicate with other entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored as one or more instructions or code on a computer-readable medium. Computer-readable media does not refer to transitory propagating signals. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of supporting location services, comprising:
   receiving a request for a location service for a user equipment (UE) by a home Node B (HNB);
   exchanging Positioning Calculation Application Part (PCAP) messages with a location server via an HNB Gateway (HNB GW) to support the location service for the UE,
   wherein the PCAP messages are transferred in messages of a first protocol between the HNB and the HNB GW and are transferred in messages of a second protocol between the HNB GW and the location server; and
   supporting the location service for the UE by exchanging Radio Resource Control (RRC) messages with the UE; and
   wherein the exchanging PCAP messages comprises receiving a PCAP message from the location server, and
   wherein the exchanging RRC messages comprises sending an RRC message to the UE, the RRC message including a positioning request, or assistance data, or both obtained from the PCAP message.

2. The method of claim 1, further comprising:
   obtaining a location estimate for the UE from the location server or the UE; and
   returning the location estimate for the UE in a response to the request.

3. The method of claim 1, wherein the exchanging RRC messages comprises receiving an RRC message from the UE, and wherein the exchanging PCAP messages comprises sending a PCAP message to the location server, the PCAP message including measurements made by the UE, or a location estimate for the UE, or both obtained from the RRC message.

4. The method of claim 1, wherein the first protocol comprises a PCAP User Adaptation (PUA) protocol or a Radio Access Network Application Part (RANAP) User Adaptation (RUA) protocol, and wherein the second protocol comprises a Signaling Connection Control Part (SCCP) protocol.

5. The method of claim 4, wherein the PCAP messages are connection-oriented messages and PUA messages are associated with a SCCP connection.

6. The method of claim 4, wherein a PUA message includes an identifier of the location server, a PCAP transaction identifier, a local connection reference, a PCAP message, or a combination thereof.

7. The method of claim 1, wherein the location service includes positioning to determine location of the UE, or delivery of assistance data to the UE, or both.

8. The method of claim 1, further comprising:
   sending information for the HNB to the location server, the information comprising a cell global identifier (CGI) for the HNB, an International Mobile Subscriber Identity (IMSI) for the HNB, an International Mobile Equipment Identity (IMEI) for the HNB, location of the HNB, at least one cell ID of at least one neighbor cell, positioning capabilities of the HNB, or a combination thereof.

9. The method of claim 1, wherein the location server comprises a Standalone Serving Mobile Location Center (SAS) communicating with the HNB via the HNB GW.

10. An apparatus for wireless communication, comprising:
    means for receiving a request for a location service for a user equipment (UE) by a home Node B (HNB);

means for exchanging Positioning Calculation Application Part (PCAP) messages with a location server via an HNB Gateway (HNB GW) to support the location service for the UE, wherein the PCAP messages are transferred in messages of a first protocol between the HNB and the HNB GW and are transferred in messages of a second protocol between the HNB GW and the location server; and means for supporting the location service for the UE by exchanging Radio Resource Control (RRC) messages with the UE; and wherein the exchanging PCAP messages comprises means for receiving a PCAP message from the location server, and wherein the means for exchanging RRC messages comprises means for sending an RRC message to the UE, the RRC message including a positioning request, or assistance data, or both obtained from the PCAP message.

11. The apparatus of claim 10, wherein the means for exchanging RRC messages comprises means for receiving an RRC message from the UE, and wherein the means for exchanging PCAP messages comprises means for sending a PCAP message to the location server, the PCAP message including measurements made by the UE, or a location estimate for the UE, or both obtained from the RRC message.

12. The apparatus of claim 10, further comprising:

means for sending information for the HNB to the location server, the information comprising a cell global identifier (CGI) for the HNB, an International Mobile Subscriber Identity (IMSI) for the HNB, an International Mobile Equipment Identity (IMEI) for the HNB, location of the HNB, at least one cell ID of at least one neighbor cell, positioning capabilities of the HNB, or a combination thereof.

* * * * *